US012634658B2

(12) United States Patent
Pham Van et al.

(10) Patent No.:  US 12,634,658 B2
(45) Date of Patent:       May 19, 2026

(54) MULTICAST AND BROADCAST SERVICES FOR USER EQUIPMENTS IN IDLE AND INACTIVE STATES

(71) Applicant: Telefonaktiebolaget LM Ericsson (publ), Stockholm (SE)

(72) Inventors: Dung Pham Van, Upplands Väsby (SE); Erik Stare, Sollentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 690 days.

(21) Appl. No.: 18/011,863

(22) PCT Filed: Jun. 28, 2021

(86) PCT No.: PCT/EP2021/067648
§ 371 (c)(1),
(2) Date: Dec. 21, 2022

(87) PCT Pub. No.: WO2022/002830
PCT Pub. Date: Jan. 6, 2022

(65) Prior Publication Data
US 2023/0239661 A1      Jul. 27, 2023

Related U.S. Application Data

(60) Provisional application No. 63/045,441, filed on Jun. 29, 2020.

(51) Int. Cl.
*H04W 4/06*        (2009.01)
*H04W 68/02*       (2009.01)
*H04W 76/20*       (2018.01)

(52) U.S. Cl.
CPC ............. *H04W 4/06* (2013.01); *H04W 68/02* (2013.01); *H04W 76/20* (2018.02)

(58) Field of Classification Search
CPC ........ H04W 4/06; H04W 76/20; H04W 68/02
See application file for complete search history.

(56) References Cited

U.S. PATENT DOCUMENTS

| | | | |
|---|---|---|---|
| 2015/0049662 A1* | 2/2015 | Kim ...................... | H04W 48/20 370/312 |
| 2015/0133081 A1* | 5/2015 | Griot .................... | H04M 15/58 455/552.1 |

(Continued)

FOREIGN PATENT DOCUMENTS

| | | |
|---|---|---|
| JP | 2006-512875 A | 4/2006 |
| WO | 2004102837 A1 | 11/2004 |

(Continued)

OTHER PUBLICATIONS

Notice of Reasons for Rejection for Japanese Patent Application No. 2022-580366, including English translation, dated Mar. 5, 2024, 13 pages.

(Continued)

*Primary Examiner* — Ajay Cattungal
(74) *Attorney, Agent, or Firm* — Sage Patent Group

(57)                ABSTRACT

Embodiments of the present disclosure provide a method, a user equipment, UE, a network node, and a computer program product for providing multicast and broadcast services, MBS, to one or more User Equipments, UEs, in a wireless communication network. The method is performed by a network node in the wireless communication network. The method comprises determining the one or more UEs in one of: a Radio Resource Control, RRC, IDLE state and a RRC INACTIVE state. The method comprises transmitting a paging message indicating a Point-To-Multipoint, PTM, configuration information to be acquired by the determined one or more UEs for enabling reception of MBS data in one of the RRC IDLE state and the RRC INACTIVE state. Further, the method comprises transmitting the MBS data to (Continued)

200

Decide a RRC state of one or more UEs for reception of MBS data — 201

Determine the one or more UEs in one of: a Radio Resource Control, RRC, IDLE state and a RRC INACTIVE state — 202

204
Determine to transmit Point-to-Multipoint, PTM, configuration information through a common control channel?

NO

YES

205
Transmit the PTM configuration information to the one or more UEs through the common control channel 206
Transmit a paging message indicating the PTM configuration information Transmit the MBS data to the determined one or more UEs using a PTM configuration indicated by the PTM configuration information — 208 the determined one or more UEs using a PTM configuration indicated by the PTM configuration information.

Corresponding base station, UE, and computer program products are also disclosed.

26 Claims, 14 Drawing Sheets

(56)                References Cited

U.S. PATENT DOCUMENTS

| | | | |
|---|---|---|---|
| 2016/0381517 A1* | 12/2016 | Kim | H04W 76/10 |
| | | | 370/331 |
| 2017/0244456 A1* | 8/2017 | Kim | H04B 7/0602 |
| 2017/0245121 A1* | 8/2017 | Jung | H04W 48/20 |
| 2017/0339606 A1* | 11/2017 | Kim | H04W 36/22 |
| 2018/0049060 A1* | 2/2018 | Fujishiro | H04W 72/30 |
| 2018/0115430 A1* | 4/2018 | Seo | H04L 1/1854 |
| 2018/0206080 A1 | 7/2018 | Chen et al. | |
| 2018/0242206 A1* | 8/2018 | Kim | H04W 36/0055 |
| 2019/0182632 A1* | 6/2019 | Fujishiro | H04W 48/16 |
| 2019/0223156 A1* | 7/2019 | Fujishiro | H04W 76/15 |
| 2019/0261140 A1 | 8/2019 | Fujishiro et al. | |
| 2023/0171565 A1* | 6/2023 | Hori | H04W 72/30 |
| | | | 455/3.01 |
| 2023/0171790 A1* | 6/2023 | Hori | H04W 72/30 |
| | | | 370/329 |

FOREIGN PATENT DOCUMENTS

| | | |
|---|---|---|
| WO | 2016119212 A1 | 8/2016 |
| WO | 2018030305 A1 | 2/2018 |
| WO | 2021147542 A1 | 7/2021 |

OTHER PUBLICATIONS

Kyocera, "Details of radio interface enhancements for SC-PTM transmission," R2-153777, 3GPP TSG-RAN WG2 #91, Beijing, China, Aug. 24-28, 2015, 9 pages.

International Search Report and Written Opinion of the International Searching Authority, PCT/EP2021/067648, mailed Oct. 21, 2021, 16 pages.

NEC: "SC-PTM Configuration", 3GPP Draft; R2-153635, 3rd Generation Partnership Project (3GPP), 3GPP TSG RAN WG2 Meeting #91, Beijing, China, Aug. 24-28, 2015, 5 pages.

CATT: "Summary of Email Discussion [Post111-e] [906] [MBS] Idle mode support", 3GPP Draft, 3rd Generation Partnership Project (3GPP) , XP051941902, R2-2008796, Electronic, Nov. 2-13, 2022, 56 pages.

Ericsson: "MBS reception in idle and Inactive mode", 3GPP Daft, R2-2009953, 3rd Generation Partnership Project (3GPP), eMeeting, Nov. 2-13, 9 pages.

* cited by examiner

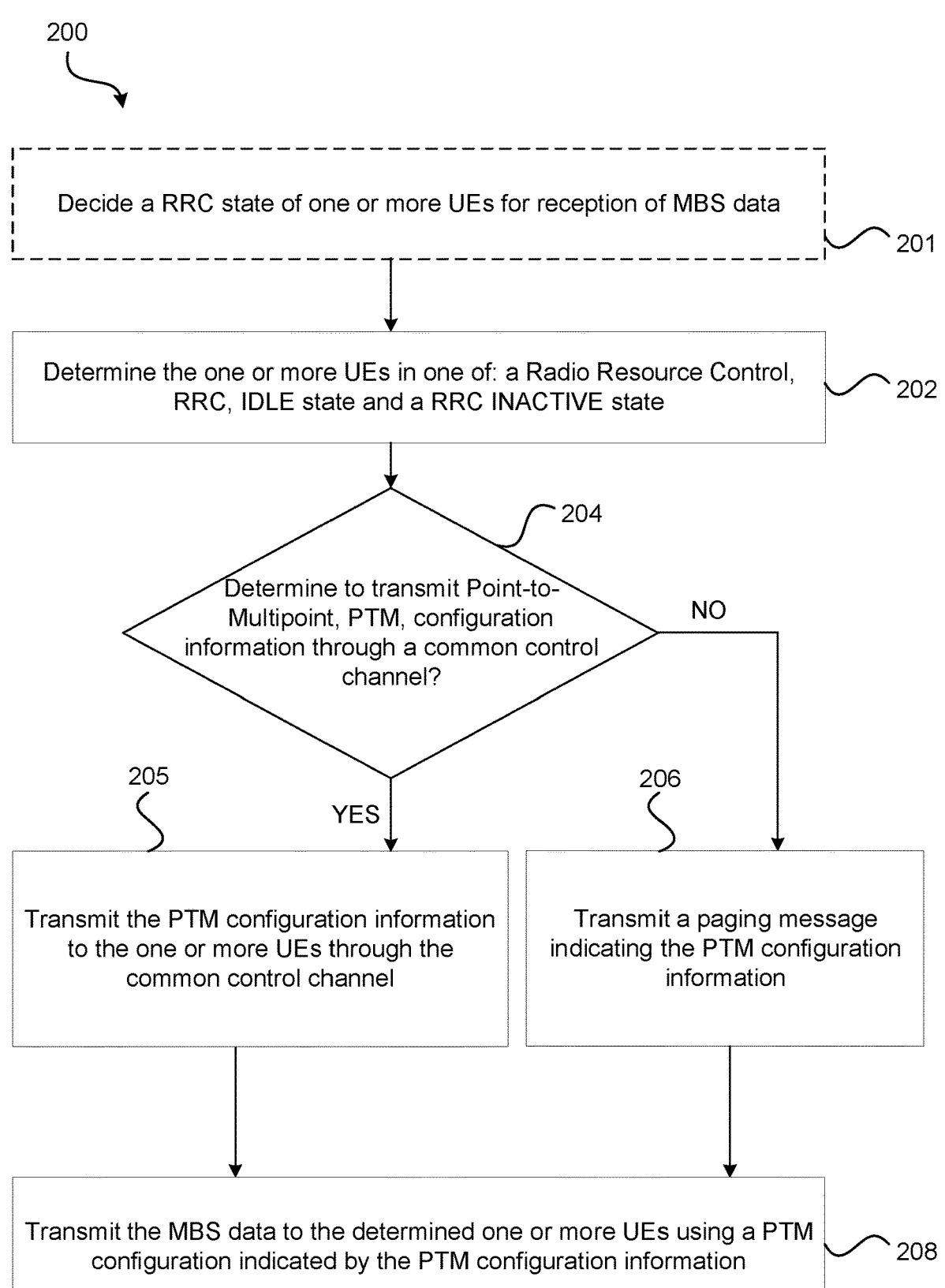

200

Decide a RRC state of one or more UEs for reception of MBS data ⟿ 201

Determine the one or more UEs in one of: a Radio Resource Control, RRC, IDLE state and a RRC INACTIVE state ⟿ 202

Determine to transmit Point-to-Multipoint, PTM, configuration information through a common control channel? — 204

NO

YES

205

Transmit the PTM configuration information to the one or more UEs through the common control channel

206

Transmit a paging message indicating the PTM configuration information

Transmit the MBS data to the determined one or more UEs using a PTM configuration indicated by the PTM configuration information ⟿ 208

Transition to an idle state or an inactive state    302

Determine PTM configuration information    304

Receive a paging message indicating a PTM configuration information    306

Receive MBS data from a network node based on the PTM configuration information    308

400

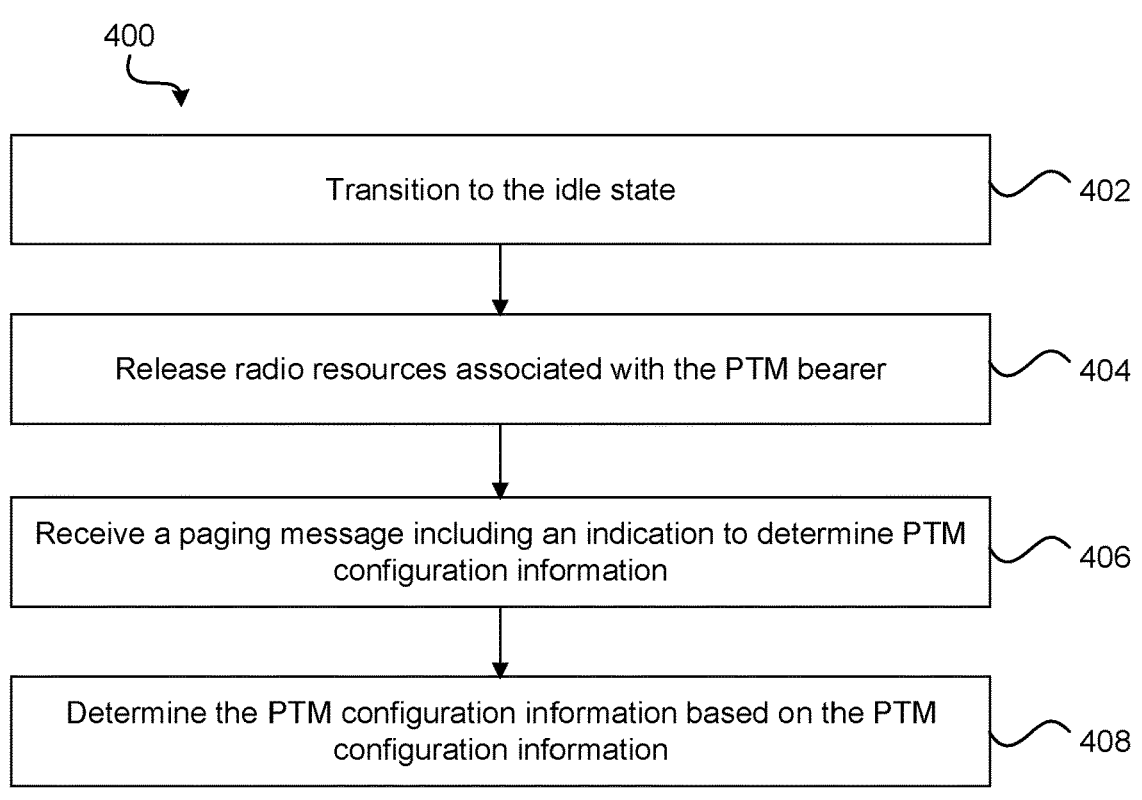

Transition to the idle state — 402

Release radio resources associated with the PTM bearer — 404

Receive a paging message including an indication to determine PTM configuration information — 406

Determine the PTM configuration information based on the PTM configuration information — 408

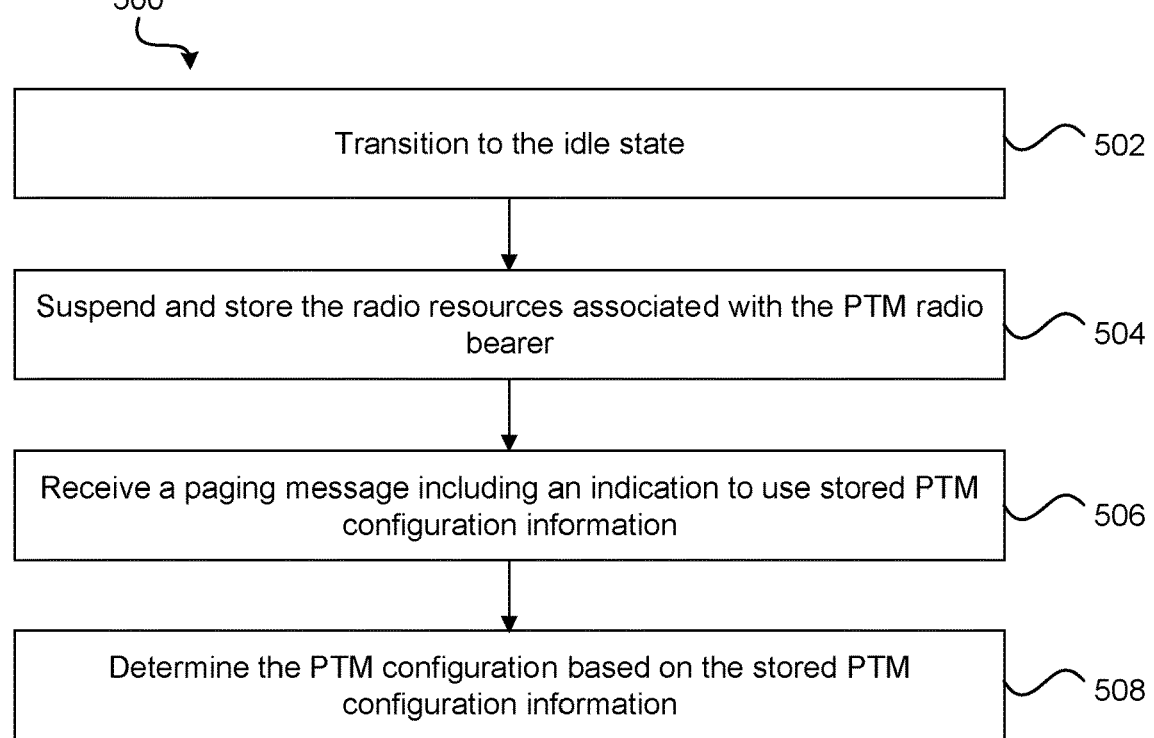

Transition to the idle state — 502

Suspend and store the radio resources associated with the PTM radio bearer — 504

Receive a paging message including an indication to use stored PTM configuration information — 506

Determine the PTM configuration based on the stored PTM configuration information — 508

FIG. 5

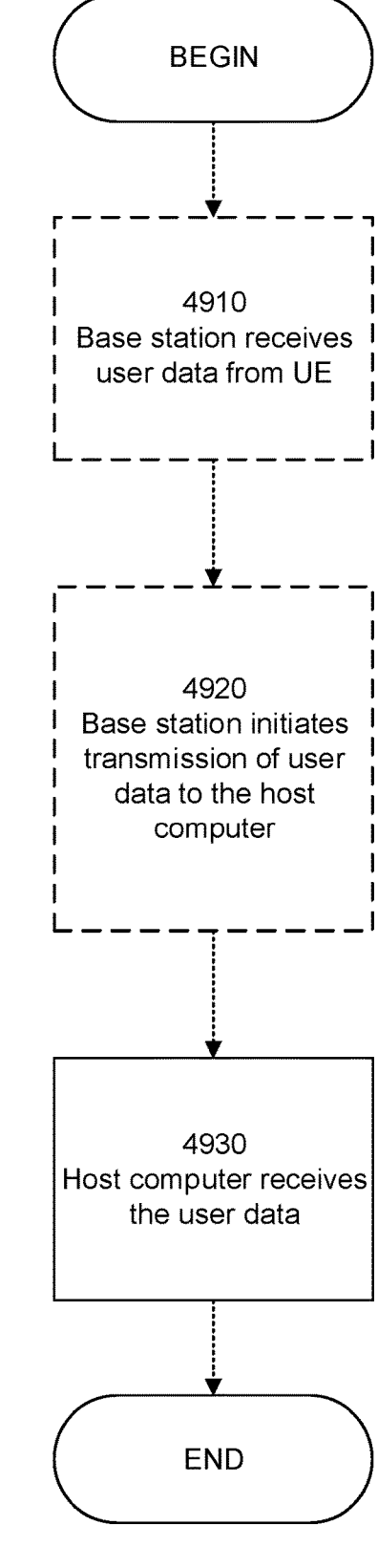

BEGIN

4810
UE receives input data
provided at host computer

4811
UE executes client
application

4820
UE provides user
data

4821
UE executes client
application

4830
UE initiates
transmission of the user
data to the host
computer

4840
Host computer receives
user data transmitted
from the UE

END

FIG. 16

BEGIN

4910
Base station receives
user data from UE

4920
Base station initiates
transmission of user
data to the host
computer

4930
Host computer receives
the user data

END

FIG. 17

MULTICAST AND BROADCAST SERVICES FOR USER EQUIPMENTS IN IDLE AND INACTIVE STATES

This application is a 35 U.S.C. § 371 national stage application of PCT International Application No. PCT/EP2021/067648 filed on Jun. 28, 2021, which in turns claims domestic priority to U.S. Provisional Patent Application No. 63/045,441, filed on Jun. 29, 2020, the disclosures and content of which are incorporated by reference herein in their entirety.

TECHNICAL FIELD

The present disclosure relates generally to the field of wireless communication. More particularly, it relates to method, user equipment, UE, network node and computer program products for providing multicast and broadcast services, MBS, to one or more user equipments in IDLE and INACTIVE states.

BACKGROUND

With the rapid development of the Internet and the popularization of large-screen multi-function mobile terminals, a large number of mobile data multimedia services and various high bandwidth multimedia services have emerged, such as a video conferencing, television broadcasting, video on demand, advertising, online education and interactive games. In particular, these mobile data multimedia services require that multiple users can receive the same data at the same time. Compared with common data services, the mobile data multimedia services have the characteristics of large data volume, long duration, sensitivity to delay and the like.

In order to make effective use of mobile network resources, the 3rd Generation Partnership Project, 3GPP, proposes a multimedia broadcast multicast service, MBMS, which is a technology for transmitting data to multiple target mobile terminals from one data source.

The MBMS defined by the 3GPP can not only achieve multicast and broadcast of low-rate plain text message, but also can achieve broadcast and multicast of high-speed multimedia services, and thus can provide a wide range of rich video, audio and multimedia services. The MBMS is transmitted over a point-to-Multipoint, PTM interface designed to provide efficient delivery of broadcast and multicast services within a 3GPP cellular network. When MBMS services are broadcasted, all cells inside a multimedia broadcast multicast service single frequency network, MBSFN, area transmit the same MBMS service.

Users access these services and obtain the MBMS content through wireless communication devices such as cellular phones, tablets, laptops, and other devices with wireless transceivers that communicate with the base stations within the wireless communication system. The base stations, sometimes referred to as eNodeBs provide wireless services to the wireless communication devices, sometimes referred to as user equipment UE, within cells.

The UEs may be in one of at least two modes including a connected mode and an idle mode. A UE is in connected mode when a radio resource control, RRC, connection has been established. If no RRC connection is established, the UE is in the idle mode. Therefore, the connected mode comprises an established RRC connection, while there is no established RRC Connection in the Idle mode. The UEs receive the MBMS content in connected mode after establishing the RRC connection.

In existing new radio, NR, specification, there is no broadcast or multicast feature for PTM transmissions to the UEs and the available point-to-point transmission can be extended for PTM transmissions to the UEs in RRC CONNECTED state. However, there is a limit on the number of UEs which can receive the MBS data in the CONNECTED state with respect to each gNB or NR cell. Therefore, the NR cell cannot transmit the MBS data to all the UEs which are in RRC CONNECTED state.

Consequently, there is a need for an improved method and arrangement for providing multicast and broadcast services, MBS, to the UEs that alleviates at least some of the above cited problems.

SUMMARY

Especially, when there is a necessity to broadcast data or safety alerts in a geographical region to a very large number, or even indefinite, number of user equipments, UEs, simultaneously, e.g., public safety applications, it would be advantageous to serve the UEs directly in RRC_IDLE or RRC_INACTIVE state without transitioning the UEs to RRC_CONNECTED state, or requiring a prior configuration in RRC Connected state.

It is therefore an object of the present disclosure to provide a method, a user equipment, a network node, and a computer program product for providing multicast and broadcast services, MBS, that seeks to mitigate, alleviate, or eliminate all or at least some of the above-discussed drawbacks of presently known solutions.

This and other objects are achieved by means of a method, a computer program product, and a device as defined in the appended claims. The term exemplary is in the present context to be understood as serving as an instance, example or illustration.

According to a first aspect of the present disclosure, a method for providing multicast and broadcast services, MBS, to one or more User Equipments, UEs, in a wireless communication network is provided. The method is performed by a network node in the wireless communication network. The method comprises determining the one or more UEs in one of: a Radio Resource Control, RRC, IDLE state and a RRC INACTIVE state. The method comprises transmitting a paging message indicating a Point-To-Multipoint, PTM, configuration information to be acquired by the determined one or more UEs for enabling reception of MBS data in one of the RRC IDLE state and the RRC INACTIVE state. Further, the method comprises transmitting the MBS data to the determined one or more UEs using a PTM configuration indicated by the PTM configuration information.

In some embodiments, the method further comprising deciding a RRC state of the one or more UEs for reception of MBS data based on one or more of: one or more network parameters for the MBS, capability information of the one or more UEs and one or more MBS parameters.

In some embodiments, the method further comprising determining whether to transmit the PTM configuration information to the one or more UEs in one of the RRC IDLE state and the RRC INACTIVE state through a common control channel. Further, the method comprising transmitting the PTM configuration information to the one or more UEs through the common control channel when it is determined that the PTM configuration is to be transmitted through the common control channel.

In some embodiments, the paging message comprises one or more of: a service identifier, ID for the MBS, a session ID for the MBS, an indication to at least one of the determined one or more UEs for reception of the MBS data in the RRC IDLE state and the RRC INACTIVE state or a RRC connected state, an indication to at least one of the determined one or more UEs to enter the RRC CONNECTED state for acquiring the PTM configuration information, a preamble indicating that the PTM configuration for reception of the MBS data to be acquired in the RRC connected state, an indicator to be monitored by each of the UEs for obtaining the preamble, an indication for the determined one or more UEs on whether to use a pre-stored PTM configuration information or to enter a RRC CONNECTED state through a random access procedure for acquiring the PTM configuration, an indication for at least one of the determined one or more UEs on whether to reuse a recent PTM configuration or to acquire the PTM configuration, an indication whether at least one of the determined one or more UEs to enter to the RRC CONNECTED state from one of the RRC IDLE state and the RRC INACTIVE state, an indication whether a PTM transmission is a last PTM transmission in a session associated with the PTM configuration information and an indication whether the one or more UEs need to respond to the paging message.

In some embodiments, the PTM configuration information is transmitted to the one or more UEs in the RRC CONNECTED state when the paging message comprising the indication to enter the RRC CONNECTED state is transmitted.

In some embodiments, the PTM configuration information comprises one or more of: a service ID, a session ID, information related to scheduling of PTM data, and information about neighboring cells transmitting the MBS data, information of ongoing MBS sessions and information of all MBS sessions.

In some embodiments, the PTM configuration information is transmitted through a common control channel in a system information block, SIB, which is transmitted periodically by the network node.

In some embodiments, the common control channel is a PTM downlink control channel.

In some embodiments, the PTM configuration information is transmitted to the one or more UEs through the common control channel, based on reception of a request for the PTM configuration information from the one or more UEs (104a-104n) in one of the RRC IDLE state and the RRC INACTIVE state.

In some embodiments, transmitting the paging message indicating a PTM configuration information to be acquired by the one or more UEs comprises indicating the PTM configuration information through one or more SIBs, which is broadcasted periodically by the network node.

In some embodiments, transmitting a paging message indicating a PTM configuration information to be acquired by the one or more UEs comprises receiving a request for the PTM configuration information from the one or more UEs in one of the RRC IDLE state and the RRC INACTIVE state. Further, the method comprises indicating the PTM configuration information to the one or more UEs in a SIB.

In some embodiments, transmitting the paging message indicating a PTM configuration information to be acquired by the one or more UEs comprises indicating the PTM configuration information through a PTM downlink common control channel.

In some embodiments, transmitting the paging message indicating a PTM configuration information to be acquired by the one or more UEs comprises receiving information of sessions related to MBS data from the one or more UEs in a message 3, MSG 3, of the random access procedure. Further, the method comprises indicating the PTM configuration information related to the MBS data to the one or more UEs in a message 4, MSG4 of the random access procedure.

According to a second aspect of the present disclosure, a method for reception of multicast and broadcast services, MBS, from a network node, in a wireless communication network is provided. The method is performed by a user equipment in the wireless communication network. The method comprises transitioning to one of: a Radio Resource Control, RRC, IDLE state and a RRC INACTIVE state. The method comprises receiving a paging message indicating a point-to-multipoint, PTM, configuration information to be acquired for reception of MBS data in one of the RRC IDLE state and the RRC INACTIVE state. Further, the method comprises receiving the MBS data from the network node using a PTM configuration indicated by the PTM configuration information.

In some embodiments, the method further comprising determining a PTM configuration information to be acquired on a common control channel. Further, the method comprising receiving the PTM configuration information through the common control channel when the PTM configuration is determined on the common control channel.

In some embodiments, the paging message comprises one or more of: a service identifier, ID for the MBS, a session ID for the MBS, an indication to at least one of the determined one or more UEs for reception of the MBS data in the RRC IDLE state and the RRC INACTIVE state or a RRC connected state, an indication to at least one of the determined one or more UEs to enter the RRC CONNECTED state for acquiring the PTM configuration information, a preamble indicating that the PTM configuration for reception of the MBS data to be acquired in the RRC connected state, an indicator to be monitored by each of the UEs for obtaining the preamble, an indication for the determined one or more UEs on whether to use a pre-stored PTM configuration information or to enter a RRC CONNECTED state through a random access procedure for acquiring the PTM configuration, an indication for at least one of the determined one or more UEs on whether to reuse a recent PTM configuration or to acquire the PTM configuration, an indication whether at least one of the determined one or more UEs to enter to the RRC CONNECTED state from one of the RRC IDLE state and the RRC INACTIVE state, an indication whether a PTM transmission is a last PTM transmission in a session associated with the PTM configuration information and an indication whether to respond to the paging message.

In some embodiments, the step of receiving the MBS data from the network node comprises configuring a PTM radio bearer based on the PTM configuration information. Further, the method comprises receiving the MBS data using the PTM radio bearer.

In some embodiments, the PTM configuration information is received in the RRC CONNECTED state when the paging message comprising the indication for the UE to enter the RRC CONNECTED state for acquiring the PTM configuration is received.

In some embodiments, the PTM configuration information comprises one or more of: a service ID, a session ID, information related to scheduling of PTM data, and information about neighboring cells transmitting the MBS data, information of ongoing MBS sessions and information of all MBS sessions.

In some embodiments, the PTM configuration information is received through a common control channel in a system information block, SIB, which is transmitted periodically by the network node.

In some embodiments, the common control channel is a PTM downlink control channel.

In some embodiments, the PTM configuration information through the control channel is received in response to transmission of a request for the PTM configuration in one of the RRC IDLE state and the RRC INACTIVE state.

In some embodiments, receiving the paging message indicating a Point-To-Multipoint, PTM, configuration information to be acquired by the UE comprises receiving an indication of PTM configuration through one or more SIBs, which is broadcasted periodically by the network node.

In some embodiments, receiving the paging message indicating a Point-To-Multipoint, PTM, configuration information to be acquired by the UE comprises transmitting a request for the PTM configuration information in one of the RRC IDLE state and the RRC INACTIVE state. Further, the method comprises receiving an indication of the PTM configuration information in a SIB.

In some embodiments, receiving the paging message indicating a Point-To-Multipoint, PTM, configuration information to be acquired by the UE comprises receiving an indication of the PTM configuration through a PTM downlink common control channel.

In some embodiments, receiving the paging message indicating a Point-To-Multipoint, PTM, configuration information to be acquired by the UE comprises transmitting information of sessions related to MBS data in a message 3, MSG 3, of the random access procedure. Further, the method comprises receiving the PTM configuration information related to the MBS data in a message 4, MSG4 of the random access procedure.

According to a third aspect of the present disclosure, a network node for providing multicast and broadcast services, MBS, to one or more user equipments, UEs in a wireless communication network is provided. The network node being adapted for determining (202) the one or more UEs in one of: a Radio Resource Control, RRC, IDLE state and a RRC INACTIVE state. The network node being adapted for transmitting a paging message indicating a Point-To-Multipoint, PTM, configuration information to be acquired by the determined one or more UEs for enabling reception of MBS data in one of the RRC IDLE state and the RRC INACTIVE state. Further, the network node being adapted for transmitting the MBS data to the determined one or more UEs using a PTM configuration indicated by the PTM configuration information.

According to a fourth aspect of the present disclosure, there is provided a user equipment, UE, for reception of multicast and broadcast services, MBS, from a network node, in a wireless communication network is provided. The UE being adapted for transitioning to one of: a Radio Resource Control, RRC, IDLE state and a RRC INACTIVE state. The UE being adapted for receiving a paging message indicating a point-to-multipoint, PTM, configuration information to be acquired for reception of MBS data in one of the RRC IDLE state and the RRC INACTIVE state. Further, the UE being adapted for receiving the MBS data from the network node using a PTM configuration indicated by the PTM configuration information.

According to a fifth aspect of the present disclosure, there is provided a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

An advantage of some embodiments is that alternative and/or improved approaches for providing the MBS to the UEs in RRC IDLE or RRC INACTIVE state.

An advantage of some embodiments is to enable the UEs to acquire PTM configuration information of multicast or broadcast services for the UEs which are RRC IDLE or RRC INACTIVE state without the need for PTM configuration acquisition in RRC Connected state or for transitioning into RRC CONNECTED state for PTM configuration acquisition.

An advantage of some embodiments is that the reception of MBS by the UEs in RRC IDLE or RRC INACTIVE state may reduce signaling overhead that may be needed for connection establishment before being able to receive MBS data and thereby an improved battery life for the UE may be achieved.

An advantage of some embodiments is that the reception of MBS services by the UEs in RRC IDLE or RRC INACTIVE state may alleviate potential overloaded situation at a base station or a cell serving the UEs due to large number of UEs being in a CONNECTED state at a same time.

An advantage of some embodiments is that minimal or reduced overhead may be incurred by transmitting the PTM configuration information between the UEs and the base station.

An advantage of some embodiments is that the UEs may utilize the PTM configuration information to set up or establish a PTM radio bearer for reception of the MBS data in the RRC IDLE or RRC INACTIVE state.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 2 is a flowchart illustrating example method steps of a method for providing multicast and broadcast services, MBS, performed by a network node in a wireless communication network;

FIGS. 3-5 are flowcharts illustrating example method steps for reception of MBS, performed by a user equipment, UE, in the wireless communication network;

FIG. 16 is a block diagram of methods implemented in a communication system including a host computer, a base station, and a UE;

FIG. 17 is a block diagram of methods implemented in a communication system including a host computer, a base station, and a UE.

DETAILED DESCRIPTION

Figure 1:
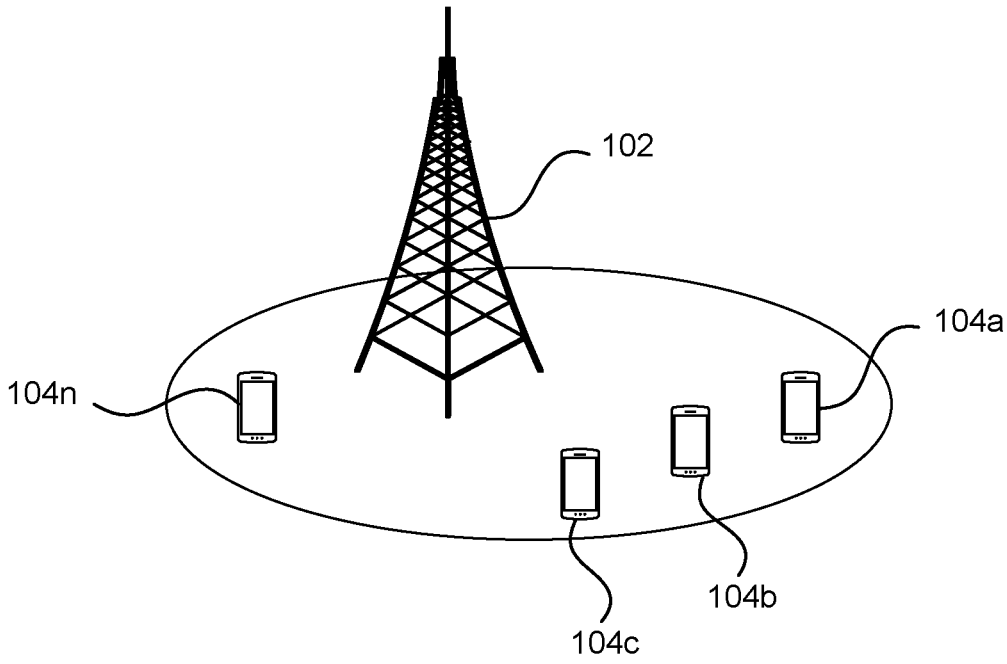
FIG. 1 discloses an example wireless communication network.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the present disclosure, user equipments, UEs, also known as mobile terminals, and/or wireless terminals are enabled to communicate wirelessly with a network node in a wireless communication network.

Typically, a network node may serve or cover one or several cells of the wireless communication network. That is, the network node provides radio coverage in the cell(s) and communicates over an air interface with the UE(s) operating on radio frequencies within its range. The network node may be also referred to as "eNB", "eNodeB", "NodeB" or "gNB", depending on the technology and terminology used. In the present disclosure, the network node device may also be referred to as a base station, BS.

In the present disclosure, it is assumed that connection establishment has already been completed between the UE(s) and the network node.

Throughout the description, the terms "INACTIVE" state and "RRC INACTIVE" shall have the same meaning and the terms "IDLE" state and "RRC IDLE" state shall have the same meaning.

In the following description of exemplary embodiments, the same reference numerals denote the same or similar components.

FIG. 1 discloses an example wireless communication network 100. As depicted in FIG. 1, the wireless communication network 100 includes a base station 104 and a plurality of user equipments, UEs 104a-104n. Although there can be a plurality of UEs 104a-104n, a single UE may be referred as a UE 104 in some embodiments of this disclosure.

The base station 102 may be for example a new radio, NR, base station i.e., a gNB or an evolved node base station i.e., eNB, or the like. The UEs 104a-104n communicates with the base station 102. The communication from the base station 102 to the UEs 104a-104n is referred to as downlink, DL, communication, whereas communication from the UEs 104a-104n to the base station 102 is referred to as uplink, UL, communication. Thus, the UEs 104a-104n involves in bidirectional radio communication with the base station 102.

The plurality of UEs 104a-104n may belong to a group and the UEs 102a-102n in the group may be identified using a group ID.

The base station 102 comprises a scheduler for dynamically scheduling downlink transmissions. The scheduler dynamically allocates resources for Physical Downlink Shared Channel, PDSCH, and sends scheduling information to the UEs 104a-104n through a control channel.

To facilitate communications, a plurality of different communication channels are established between the base station 102 and UEs 104a-104n including, among other channels, a physical downlink control channel, PDCCH. The PDCCH is a channel that allows the base station to control a UE 104a during downlink data communications. To this end, the PDCCH is used to transmit scheduling assignment or control information referred to as downlink control information, DCI, to the UE 102 to indicate scheduling to be used by the UE 104a to receive downlink communication on a physical downlink shared channel, PDSCH.

In order to make effective use of mobile network resources, the 3rd Generation Partnership Project, 3GPP, proposes a multimedia broadcast multicast service, MBMS, which is a technology for transmitting data to multiple target mobile terminals from one data source.

The MBMS defined by the 3GPP can not only achieve multicast and broadcast of low-rate plain text message, but also can achieve broadcast and multicast of high-speed multimedia services, and thus can provide a wide range of rich video, audio and multimedia services. The MBMS is transmitted over a point-to-Multipoint, PTM interface designed to provide efficient delivery of broadcast and multicast services within a 3GPP cellular network.

The UEs 104a-104n may be in one of at least two modes including a connected mode and an idle mode. For example, the UE 104a is in connected mode when a radio resource control, RRC, connection has been established. If no RRC connection is established, the UE is 104a in the idle mode. Therefore, the connected mode comprises an established RRC connection, while there is no established RRC connection in the Idle mode. The UEs 104a-104n receive the MBMS content in connected mode after establishing the RRC connection.

In existing new radio, NR, specification, there is no broadcast or multicast feature for PTM transmissions to the UEs and the available point-to-point transmission can be extended for PTM transmissions to the UEs in RRC CONNECTED state. However, there is a limit on the number of UEs which can receive the MBS data in the CONNECTED state with respect to each gNB or NR cell. Therefore, the NR cell cannot transmit the MBS data to all the UEs which are in RRC CONNECTED state.

Therefore, according to some embodiments of the present disclosure, the base station 102 implements a method for efficiently providing MBS to the UE(s) 104a-104n as described herein. Alternatively, the UE 104 may implement the method for efficient reception of MBS data from the base station 102.

According to some embodiments of the present disclosure, the base station 102 determines the one or more UEs 104a-104n in one of: a Radio Resource Control, RRC, IDLE state and a RRC INACTIVE state. For example, the base station 102 determines the UEs 104a-104n that are in RRC IDLE state and the RRC INACTIVE state in the coverage area of the base station.

When the base station 102 determines the UEs 104a-104n in the RRC IDLE state and the RRC INACTIVE state, the base station 102 transmits a paging message indicating a Point-To-Multipoint, PTM, configuration information to be acquired by the determined one or more UEs 104a-104n for enabling reception of MBS data in the RRC IDLE state and the RRC INACTIVE state.

The paging message transmitted to the UEs 104a-104n comprises one or more of: a service identifier, ID, for the MBS, a session ID for the MBS, an indication to at least one of the determined one or more UEs 104a-104n for reception of the MBS data in the RRC IDLE state and the RRC INACTIVE state or a RRC connected state, an indication to at least one of the determined one or more UEs 104a-104n to enter the RRC CONNECTED state for acquiring the PTM configuration information, a preamble indicating that the PTM configuration for reception of the MBS data to be acquired in the RRC connected state, an indicator to be monitored by each of the UEs 104a-104n for obtaining the preamble, an indication for the determined one or more UEs 104a-104n on whether to use a pre-stored PTM configuration information or to enter a RRC CONNECTED state through a random access procedure for acquiring the PTM configuration, an indication for at least one of the determined one or more UEs 104a-104n on whether to reuse a recent PTM configuration or to acquire the PTM configuration, an indication whether at least one of the determined one or more UEs to enter to the RRC CONNECTED state from one of the RRC IDLE state and the RRC INACTIVE state, an indication whether a PTM transmission is a last PTM transmission in a session associated with the PTM configuration information, and an indication whether the one or more UEs need to respond to the paging message or the like.

Further, the base station 102 transmits the MBS data to the determined one or more UEs 104a-104n using a PTM configuration indicated by the PTM configuration information.

In some embodiments, the base station may determine whether to transmit the PTM configuration information to the one or more UEs 104a-104n in one of the RRC IDLE state and the RRC INACTIVE state through a common control channel. When the base station 102 determines to transmit the PTM configuration information to the one or more UEs 104a-104n in one of the RRC IDLE state and the RRC INACTIVE state, the base station 102 transmits the PTM configuration information to the one or more UEs 104a-104n through the common control channel. For example, the common control channel is a PTM downlink control channel.

The PTM configuration information comprises one or more of: a service ID, a session ID, information related to scheduling of PTM data, and information about neighboring cells transmitting the MBS data, information of ongoing MBS sessions and information of all MBS sessions. Various embodiments in which the one or more UEs 104a-104n receive the PTM configuration from the base station 102 for reception of MBS data are explained in the later parts of the description.

FIG. 2 is a flowchart illustrating example method 200 for providing multicast and broadcast services, MBS, in a wireless communication network. As stated above, the base station performs the method 400 for providing MBS, to the UEs in the wireless communication network.

The MBS data or MBS content, referred to herein as PTM compatible service, which may be a service, data, or a program that can be accessed through the UEs. Examples of PTM compatible services include streaming audio and video and other multimedia data.

The UEs may be in one of the following modes including an idle mode, inactive mode and a connected mode. When operating in accordance with a 3GPP communication specification, operations are defined for at least an idle mode and a connected mode. For the example, two of the UEs may be in idle mode and are referred to as idle mode UEs. Further, some of the UEs may also be in connected mode that are referred to as connected mode UEs. The connected mode UEs differ from Idle mode UEs in at least that the connected mode UEs have an established RRC connection as defined by the particular 3GPP specification and the idle mode UEs do not have an established RRC connection.

Furthermore, some of the UEs in the wireless communication network 100 as shown in FIG. 1, may be in INACTIVE state, wherein these UEs be in INACTIVE state for a particular or a predefined time interval, may be configured by the base station, when there is no data reception at these UEs.

The embodiments disclosed herein are more applicable for providing MBS data to the UEs, when the one or more UEs are in one of the idle state and INACTIVE state.

At step 202, the method 300 comprises determining the one or more UEs in one of the idle state and INACTIVE state. For example, the UEs 104a-104n as shown in the FIG. 1 may be in the CONNECTED state, the IDLE state and the INACTIVE state. The base station determines one or more UEs which are either in IDLE state or the INACTIVE state for transmission of the MBS data the one or more UEs which are in the IDLE state or the INACTIVE state.

Although the base station determines one or more UEs which are either in IDLE state or the INACTIVE state for transmission of the MBS data the one or more UEs, the base station may decide a RRC state of the one or more UEs for transmission of the MBS data as specified in the optional step 201. For example, the base station may determine the RRC state of the one or more UEs based on one or more network parameters for the MBS, capability information of the one or more UEs and one or more MBS parameters, capability information of the one or more UEs and one or more MBS parameters.

In some examples, if the base station determines that the MBS data is only to be received in CONNECTED state, then the base station decides the one or more UEs to be in the CONNECTED state for reception of MBS data.

In another example, if the base station determines that there are more number of UEs, which is equal to the maximum number of UEs that can receive the MBS data in the CONNECTED state, then the base station may decide the one or more UEs to be IDLE state or INACTIVE state for reception of MBS data.

In another example, if the capability information of one or more UEs indicate that the one or more UEs may not receive the MBS data in the IDLE state or INACTIVE state, then the base station may decide the RRC state of the one or more UEs for reception of the MBS data. Thus, the base station may decide the RRC state of the one or more UEs based on network parameters for the MBS, the capability information of the one or more UEs (104*a*- and the one or more MBS parameters.

At step 204, the method 200 comprises determining to transmit the PTM configuration information through a control channel. The PTM configuration information is to be acquired by the one or more UEs for reception of the MBS data in the IDLE state or the INACTIVE state. The base station determines whether to transmit the PTM configuration information through a control channel. In case, the base station determines to transmit the PTM configuration information through the control channel, at step 205, the method 200 comprises transmitting the PTM configuration information to the one or more UEs (104*a*-104*n*) through the common control channel. For example, the base station transmits the PTM configuration information through a common control channel in a system information block, SIB, which is transmitted periodically by the network node.

In an example, the common control channel is a PTM downlink control channel. In alternative examples, the common control channel can be a new PTM downlink control channel, DCCH, for example, a newly defined multicast broadcast common control channel MBCCH, which may be carried on the physical downlink shared channel, PDSCH, used for PTM. The scheduling information of this common control channel, e.g., repetition period, modification period, first subframe, offset, and DRX parameters that allows UEs to know when to monitor for acquisition of the PTM can be provided in another SIB whose scheduling information is known by the UEs.

In an embodiment, the base station transmits the PTM configuration information to the one or more UEs through the common control channel, based on reception of a request for the PTM configuration information from the one or more UEs in one of the IDLE state and the INACTIVE state.

In an example, the base station receives the request for the PTM configuration information from the one or more UEs which are in the IDLE state or the INACTIVE state. In response to the request from the one or more UEs for the PTM configuration information, the base station transmits the PTM configuration information to the one or more UEs.

In case, at step 204, the base station determines not to transmit the PTM configuration information through the common control channel, then at step 206, the method 200 comprises transmitting a paging message indicating the PTM configuration information to the one or more UEs for reception of the MBS data.

In an example, the paging message comprises the PTM configuration information along with relevant information for acquiring the PTM configuration information in order to receive the MBS data. The paging message comprises one or more of: a service identifier, ID, for the MBS, a session ID for the MBS, an indication to at least one of the determined one or more UEs 104*a*-104*n* for reception of the MBS data in the RRC IDLE state and the RRC INACTIVE state or a RRC connected state, an indication to at least one of the determined one or more UEs 104*a*-104*n* to enter the RRC CONNECTED state for acquiring the PTM configuration information, a preamble indicating that the PTM configuration for reception of the MBS data to be acquired in the RRC connected state, an indicator to be monitored by each of the UEs 104*a*-104*n* for obtaining the preamble, an indication for the determined one or more UEs 104*a*-104*n* on whether to use a pre-stored PTM configuration information or to enter a RRC CONNECTED state through a random access procedure for acquiring the PTM configuration, an indication for at least one of the determined one or more UEs 104*a*-104*n* on whether to reuse a recent PTM configuration or to acquire the PTM configuration, an indication whether at least one of the determined one or more UEs to enter to the RRC CONNECTED state from one of the RRC IDLE state and the RRC INACTIVE state, an indication whether a PTM transmission is a last PTM transmission in a session associated with the PTM configuration information, and an indication whether the one or more UEs need to respond to the paging message or the like.

In an example, a unique factor for the MBS may be a service identifier. Each of the MBS service is associated with a unique service identifier. Thus, the paging message transmitted to the one or more UEs includes the unique service identifier associated with the MBS for reception of the MBS In an example, each MBS session is identified using a session identifier, ID. The session ID for the MBS session is transmitted in the paging message.

In some examples, the base station may determine some of the UEs to receive the MBS data in RRC IDLE state and the RRC INACTIVE state and the base station may determine some of the UEs to receive the MBS data in CONNECTED state. In such scenarios, the base station may transmit an indication to the UEs to receive the MBS data in the RRC IDLE state and the RRC INACTIVE state or a RRC connected state. Therefore, the base station may decide the state of the one or more UEs for reception of the MBS data and thus the base station may transmit the paging message comprising the indication which indicates the one or more UEs for reception of the MBS data in the RRC IDLE state and the RRC INACTIVE state or in the RRC connected state.

In some examples, the base station may decide to allow the determined one or more UEs to enter the RRC CONNECTED state for reception of MBS data. When the base station decides to allow the determined one or more UEs to enter the RRC CONNECTED state for reception of MBS data, the base station may transmit the paging message with an indication to the determined one or more UEs to enter the RRC CONNECTED state for reception of the MBS data.

In some examples, the base station may transmit the PTM configuration information through a preamble, where the preamble indicates the PTM configuration information to the one or more UEs. Thus, the base station may transmit the paging message with the preamble indicating the PTM configuration information to be acquired by the one or more UEs in the RRC CONNECTED state. When the preamble is used for indicating the PTM configuration information, the paging message may also contain an indicator which is to be monitored by the one or more UEs for obtaining the preamble.

In some examples, the base station may indicate the one or more UEs whether to use a pre-stored PTM configuration information for reception of MBS data or to allow the one or more UEs to enter the RRC CONNECTED state through a random access procedure for acquiring the PTM configuration information. Thus, the base station may transmit the paging message with an indication to indicate the one or more UEs whether to use a pre-stored PTM configuration information or to allow the one or more UEs to enter the RRC CONNECTED state through a random access procedure for acquiring the PTM configuration information. The one or more UEs upon receiving the paging message with the indication, may either use the stored PTM configuration information or shall enter the RRC CONNECTED state through a random access procedure for acquiring the PTM configuration information.

In some examples, the base station may allow the one or more UEs to enter the RRC CONNECTED state from the IDLE state or the INACTIVE state for reception of MBS data. In such case, the base station may transmit the paging message with an indication which indicates the one or more UEs to enter the RRC CONNECTED state from the IDLE state or the INACTIVE state for reception of MBS data.

In some examples, the base station may also indicate whether a PTM transmission is a last PTM transmission in a session associated with the PTM configuration information. In order to indicate whether the PTM transmission is the last PTM transmission, the base station transmits the paging message with an indication which indicates to the one or more UEs that PTM transmission is the last PTM transmission in the session associated with the PTM configuration information.

In another example, base station may also transmit the paging message with an indication that indicates whether the one or more UEs need to respond to the paging message. If the base station intends to have a response message from the one or more UEs for the transmitted paging message, then the base station may transmit the paging message with the indication to indicate the one or more UEs to respond to the paging message.

In some examples, the base station may indicate the one or more UEs about a start time interval and an end time interval of the MBS session or MBS data. In order to indicate the one or more UEs about a start time interval and an end time interval of the MBS data, the base station may transmit the paging message with an indication to indicate the one or more UEs about the a start time interval and an end time interval of a MBS session or MBS data.

Therefore, the paging message comprises the PTM configuration information along with the relevant information for acquiring the PTM configuration information in order to receive the MBS data. The paging message may include any of the above mentioned indications which enable the one or more UEs to acquire the PTM configuration information.

Further, at step 208, the method 200 comprises transmitting the MBS data to the one or more UEs using PTM configuration indicated by the PTM configuration information. The MBS data may be transmitted using multicast or broadcast to the one or more UEs using the PTM configuration indicated by the PTM configuration information.

Figure 3:
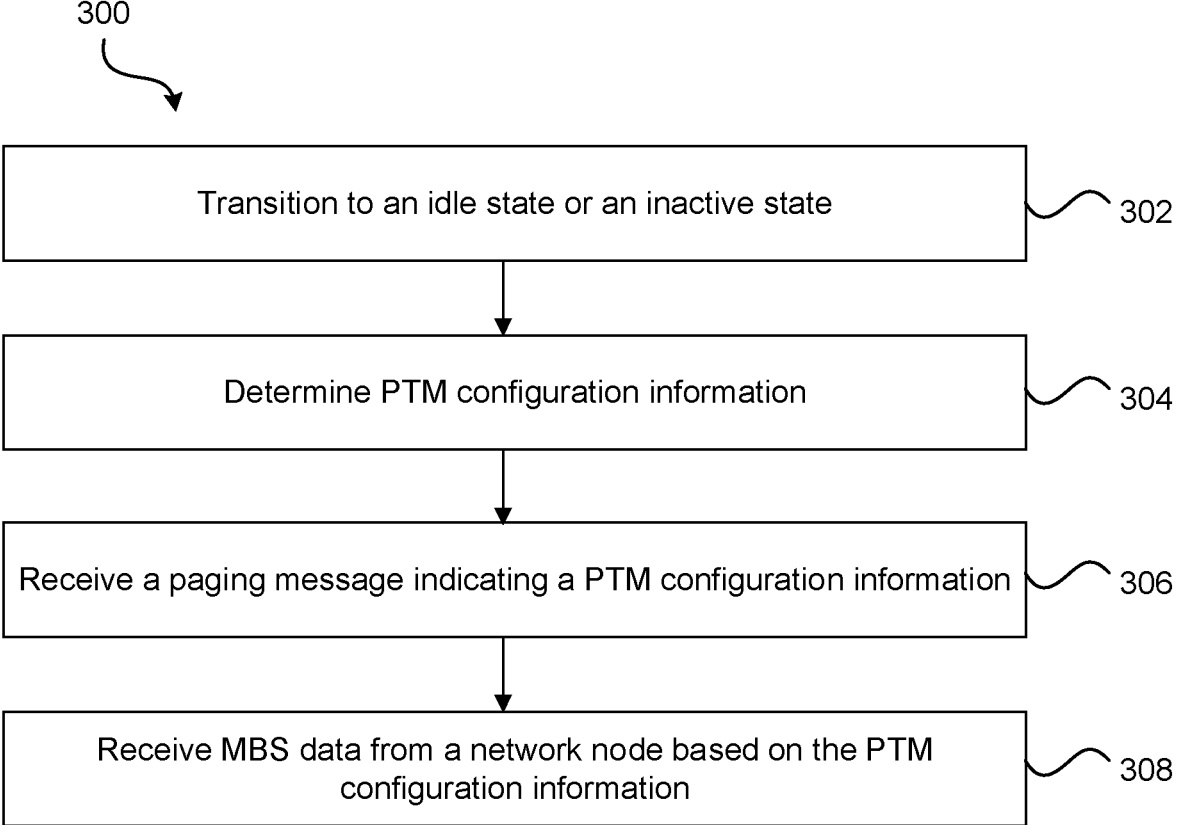

FIGS. 3-5 are flowcharts illustrating example methods 300, 400 and 500 for reception of MBS in the wireless communication network. The UE performs various steps of the methods 300, 400 and 500 for reception of the MBS data in the wireless communication network.

It should be noted that the UEs may be in one of the following modes including an idle mode, inactive mode and a connected mode. When operating in accordance with a 3GPP communication specification, operations are defined for at least an idle mode and a connected mode. For the example, two of the UEs may be in idle mode and are referred to as idle mode UEs. Further, some of the UEs may also be in connected mode that are referred to as connected mode UEs. The connected mode UEs differ from idle mode UEs in at least that the connected mode UEs have an established RRC connection as defined by the particular 3GPP specification and the idle mode UEs do not have an established RRC connection.

Consider that the one or more UEs are in the RRC CONNECTED state. When the one or more UEs are in the RRC CONNECTED state, at step 302, the method 300 comprises transitioning to the IDLE state or the INACTIVE state. The one or more UEs transition to the IDLE state or the INACTIVE state from the CONNECTED state. Upon transitioning to the IDLE state or the INACTIVE state from the CONNECTED state, at step 304, the method 300 comprises determining the PTM configuration information to be acquired on the common control channel. If the PTM configuration information is determined on the common control channel, the one or more UEs receive the PTM configuration information through the common control. For example, the UE may receive the PTM configuration information through the common control channel in a SIB, which is transmitted periodically by the base station.

In an example, the common control channel is a PTM downlink control channel.

In an embodiment, the PTM configuration information comprises one or more of: a service ID, a session ID, information related to scheduling of PTM data, and information about neighboring cells transmitting the MBS data, information of ongoing MBS sessions and information of all MBS sessions.

In case the PTM configuration information is not determined on the common control channel, then at step 306, the method 300 comprises receiving a paging message indicating the PTM configuration information. The one or more UEs receive the paging message from the base station which indicates the PTM configuration information.

As already described above, the paging message received from the base station comprises one or more of: a service identifier, ID, for the MBS, a session ID for the MBS, an indication to at least one of the determined one or more UEs 104a-104n for reception of the MBS data in the RRC IDLE state and the RRC INACTIVE state or a RRC connected state, an indication to at least one of the determined one or more UEs 104a-104n to enter the RRC CONNECTED state for acquiring the PTM configuration information, a preamble indicating that the PTM configuration for reception of the MBS data to be acquired in the RRC connected state, an indicator to be monitored by each of the UEs 104a-104n for obtaining the preamble, an indication for the determined one or more UEs 104a-104n on whether to use a pre-stored PTM configuration information or to enter a RRC CONNECTED state through a random access procedure for acquiring the PTM configuration, an indication for at least one of the determined one or more UEs on whether to reuse a recent PTM configuration or to acquire the PTM configuration, an indication whether at least one of the determined one or more UEs to enter to the RRC CONNECTED state from one of the RRC IDLE state and the RRC INACTIVE state, an indication whether a PTM transmission is a last PTM transmission in a session associated with the PTM configuration information, and an indication whether the one or more UEs need to respond to the paging message or the like.

The one or more indications in the paging message enable the UE to acquire the PTM configuration information for reception of the MBS data. The UE monitors the paging message and determines the PTM configuration to be acquired for reception of the MBS data. The UE may receive one or more of the indications mentioned above, in the paging message for acquiring the PTM configuration information.

At step 308, the method 300 comprises receiving MBS data from the base station based on the PTM configuration information. The MBS data may be received using multicast or broadcast from the base station using the PTM configuration information received through the paging message or through the common control channel.

FIG. 4 is a flow chart illustrating example method 400 for determining the PTM configuration information based on a new PTM configuration information.

At step 402, the method 400 comprises transitioning to the idle state or the inactive state. For example, when the UE transitions to the idle state, at step 404, the method 400 comprises releasing radio resources associated with a PTM bearer. Responsive to transitioning to the idle state or the inactive state, and while in the idle state or the inactive state, at step 406, the method 400 comprises receiving a paging message including an indication to determine a new PTM configuration information. At step 408, the method 400 comprises determining the PTM configuration based on the new PTM configuration information.

In some embodiments, the paging message includes an indication to initiate a random access, RA, procedure and to transition to a connected state. Determining the new PTM configuration information includes, responsive to receiving the paging message, the UE transitions to a connected state and receives, the new PTM configuration information through a radio resource control, RRC, procedure.

In some embodiments, the paging message further indicates the UE the new PTM configuration information. Determining the new PTM configuration information includes monitoring a communication channel while the UE is in the idle state or in the inactive. The new PTM configuration information may be determined via a SIB or a PTM downlink channel during a predetermined period of time. Existing SIBs in current NR standard, e.g., SIBs 2-14 can be extended to include PTM configuration information or a new SIB may be defined.

In some embodiments, the paging message further indicates the UE, the determined the PTM configuration information. Determining the PTM configuration information includes, responsive to receiving the paging message and while in the idle state or the inactive state, transmitting, a message 3, Msg3, as part of a RA procedure, the Msg3 including a request for the PTM configuration; and responsive to transmitting the Msg3 and while in the idle state or in the inactive state, and receiving the PTM configuration as part of a message 4, Msg4, while in the idle state or the inactive state.

In some embodiments, determining the PTM configuration information includes the PTM configuration information of all ongoing MBS sessions on a common control channel via a SIB that is periodically transmitted by the base station.

In some embodiments, determining the PTM configuration information includes transmitting a request for the PTM configuration information to the base station during a random access, RA, procedure; and responsive to transmitting the request, receiving the PTM configuration information via a SIB.

In some embodiments, determining the PTM configuration information receiving scheduling information for a PTM downlink control channel via a SIB; and receiving the PTM configuration information via the PTM downlink control channel based on the scheduling information.

It should be noted that the PTM downlink channel includes a multicast broadcast common control channel, MBCCH, which is carried on a physical downlink shared channel, PDSCH, for PTM. The scheduling information includes at least one of a repetition period, a modification period, a first subframe, an offset, and discontinuous reception, DRX, parameters.

FIG. 5 is a flow chart illustrating an example method 500 for determining the PTM configuration based on a stored PTM configuration information.

At step 502, the method 500 comprises transitioning to the idle state or the inactive state. At step 504, responsive to transitioning to the idle state, the method 500 comprises suspending and storing radio resources associated with the PTM radio bearer. At step 506, the method 500 comprises responsive to transitioning to the idle state or the inactive state, and while in the idle state or the inactive state, receiving a paging message comprising an indication to use stored PTM configuration information. At step 508, the method 500 comprises determining the PTM configuration information based on the stored PTM configuration information. The UE determines the stored PTM configuration information for determining the PTM configuration information.

Figure 6:
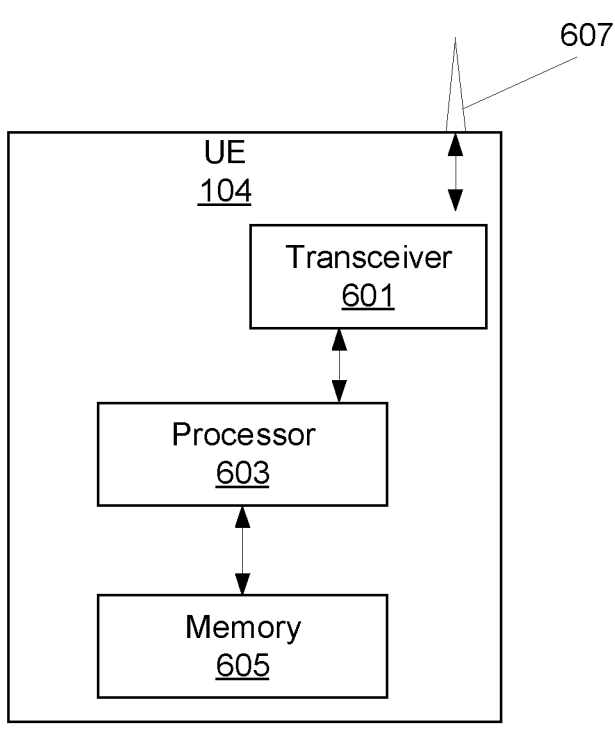
FIG. 6 is an example schematic diagram showing functional modules of the UE.

FIG. 6 is an example schematic diagram showing functional modules of the UE according to some embodiments. As shown, in FIG. 6, the UE 104 may include an antenna 607, e.g., corresponding to antenna 4111 of FIG. 9, and a transceiver circuitry 601 also referred to as a transceiver, e.g., corresponding to interface 4114 of FIG. 9, including a transmitter and a receiver configured to provide uplink and downlink radio communications with a base station(s), e.g., corresponding to network node 4160 of FIG. 9, also referred to as a radio access network. The UE 104 may also include a processing circuitry 603 also referred to as a processor, e.g., corresponding to processing circuitry 4120 of FIG. 9, coupled to the transceiver circuitry, and memory circuitry 605 also referred to as memory, e.g., corresponding to device readable medium 4130 of FIG. 9, coupled to the processing circuitry. The memory circuitry 605 may include computer readable program code that when executed by the processing circuitry 303 causes the processing circuitry to perform operations according to embodiments disclosed herein. According to other embodiments, processing circuitry 603 may be defined to include memory so that separate memory circuitry is not required.

Various operations of the UE 104 may be performed by processing circuitry 603 and/or transceiver circuitry 301. For example, the processing circuitry 303 may control transceiver circuitry 601 to transmit communications through transceiver circuitry 601 over a radio interface to a radio access network node which is a base station and/or to receive communications through transceiver circuitry 601 from the base station over a radio interface. Moreover, modules may be stored in memory circuitry 605, and these modules may provide instructions so that when instructions of a module are executed by processing circuitry 303, the processing circuitry 303 performs respective operations as defined in the steps shown in the FIGS. 3-5.

Figure 7:
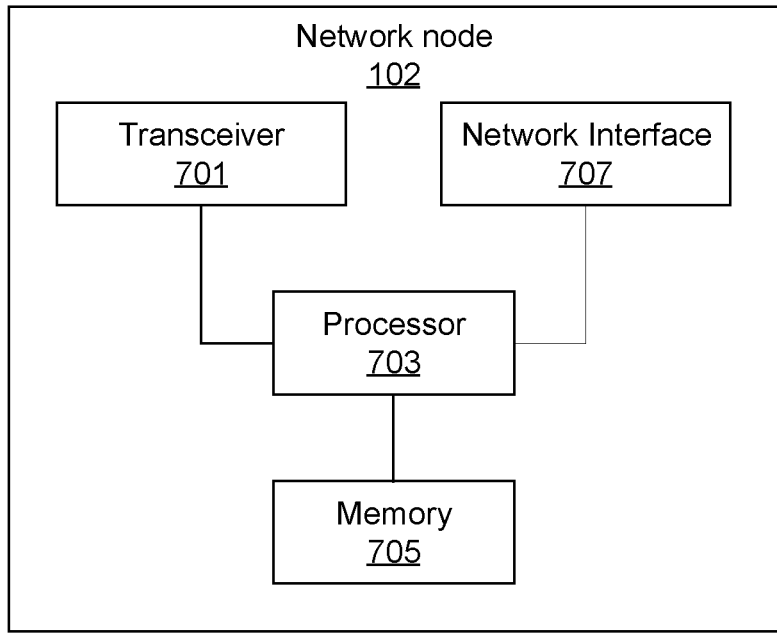
FIG. 7 is an example schematic diagram showing functional modules of the network node.

FIG. 7 is an example schematic diagram showing functional modules of a network node 102 according to some embodiments. As shown, the network node 102 may include transceiver circuitry 701 (also referred to as a transceiver, e.g., corresponding to portions of interface 4190 of FIG. 9) including a transmitter and a receiver configured to provide uplink and downlink radio communications with mobile terminals. The network node 102 may include network interface circuitry 707 (also referred to as a network interface, e.g., corresponding to portions of interface 4190 of FIG. 9) configured to provide communications with other nodes, e.g., with other base stations, of a radio access network and/or core network. The network node 102 may also include processing circuitry 703 (also referred to as a processor, e.g., corresponding to processing circuitry 4170) coupled to the transceiver circuitry, and memory circuitry 705 (also referred to as memory, e.g., corresponding to device readable medium 4180 of FIG. 9) coupled to the processing circuitry. The memory circuitry 705 may include computer readable program code that when executed by the processing circuitry 703 causes the processing circuitry to perform operations according to embodiments disclosed in the FIG. 2. In some embodiments, processing circuitry 703 may be defined to include memory so that a separate memory circuitry is not required.

Various operations of the network node 400 may be performed by the processing circuitry 703, the network interface 707, and/or the transceiver 701. For example, processing circuitry 703 may control transceiver 701 to transmit downlink communications through transceiver 701 over a radio interface to one or more UEs and/or to receive uplink communications through the transceiver 701 from the one or more UEs over a radio interface. Similarly, the processing circuitry 703 may control network interface 707 to transmit communications through the network interface 707 to one or more other network nodes and/or to receive communications through network interface from one or more other network nodes. Moreover, modules may be stored in memory 705, and these modules may provide instructions so that when instructions of a module are executed by processing circuitry 403, processing circuitry 403 performs respective operations, e.g., operations discussed below with respect to embodiments relating to network nodes as described in the FIG. 2.

In some embodiments, the network node 102 may be implemented as a core network, CN, node without a transceiver. In such embodiments, transmission to the UEs may be initiated by the network node 102 so that transmission to the UE is provided through the network node 102 including a transceiver, e.g., through a base station or RAN node.

Figure 8:
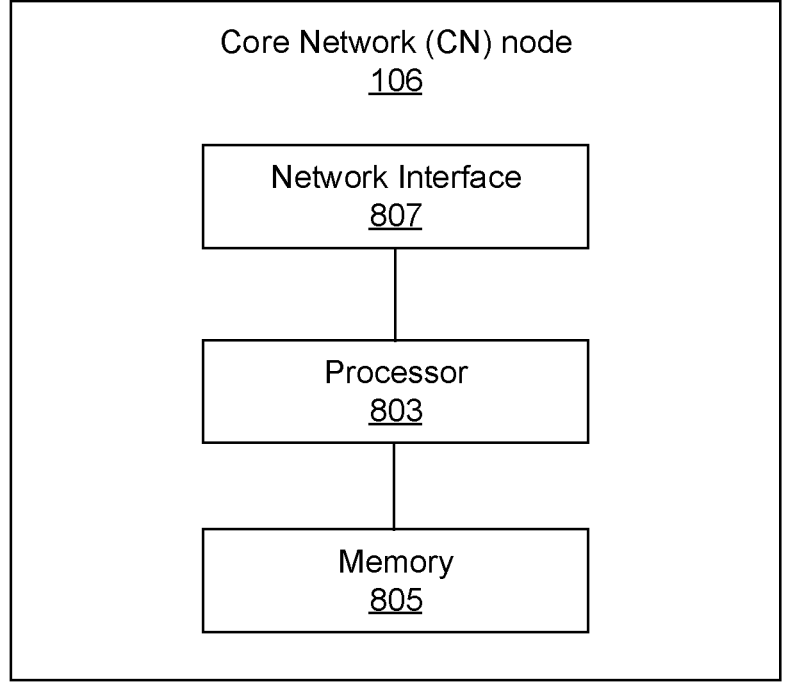
FIG. 8 is an example schematic diagram showing functional modules of a core network, CN, node.

FIG. 8 is an example schematic diagram showing functional modules of a core network, CN, node 106 according to some embodiments. The CN, node 106 may be a session management function, SMF, or an access and mobility management function, AMF. The CN node 106 may include a network interface 807 configured to provide communications with other nodes of the core network and/or the RAN. The CN node 106 may also include a processor 803 coupled to the network interface 807, and a memory 805 coupled to the processor 803. The memory 805 may include computer readable program code that when executed by the processor 803 causes the processing circuitry to perform various steps as described in the FIG. 2.

Various operations of the CN node 106 may be performed by the processor 803 and/or network interface 807. For example, the processor 803 may control network interface 507 to transmit communications through network interface 807 to the one or more other network nodes and/or to receive communications through network interface 807 from one or more other network nodes. Moreover, modules may be stored in the memory 805, and these modules may provide instructions so that when instructions of a module are executed by the processor 803, the processor 803 performs respective operations as explained in the FIG. 2.

Figure 9:
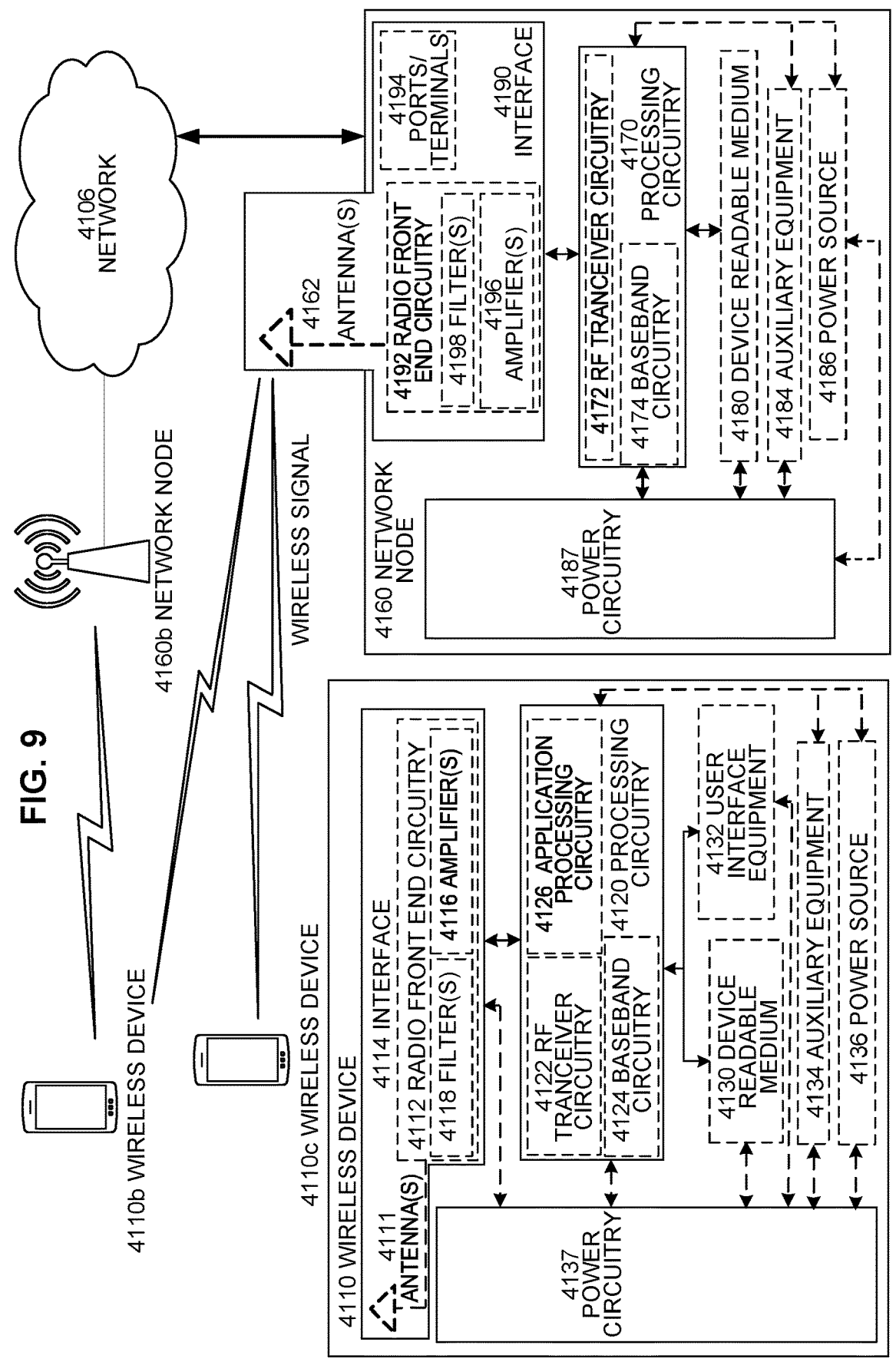
FIG. 9 is a block diagram of a wireless network.

FIG. 9 is another block diagram of a wireless network according to some embodiments. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications, GSM, Universal Mobile Telecommunications System UMTS, Long Term Evolution, LTE, and/or other suitable 2G, 3G, 4G, or 5G standards; wireless local area network, WLAN, standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 9 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device, WD, refers to a UE or a device capable, configured, arranged and/or operable to communicate wirelessly with network nodes and/or other wireless devices. Unless otherwise noted, the term WD may be used interchangeably herein with the UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP, VoIP, phone, a wireless local loop phone, a desktop computer, a personal digital assistant, PDA, a wireless cameras, a gaming console or device, a music storage device, a playback appliance, a wearable terminal device, a wireless endpoint, a mobile station, a tablet, a laptop, a laptop-embedded equipment, LEE, a laptop-mounted equipment, LME, a smart device, a wireless customer-premise equipment, CPE, a vehicle-mounted wireless terminal device, or the like. A WD may support device-to-device, D2D, communication, for example by implementing a 3GPP standard for sidelink communication, vehicle-to-vehicle, V2V, vehicle-to-infrastructure V2I, vehicle-to-everything, V2X and may in this case be referred to as a D2D communication device.

As yet another specific example, in an Internet of Things, IoT scenario, a WD may represent a machine or other device that performs monitoring and/or measurements, and transmits the results of such monitoring and/or measurements to another WD and/or a network node. The WD may in this case be a machine-to-machine, M2M, device, which may in a 3GPP context be referred to as an MTC device. As one particular example, the WD may be a UE implementing the 3GPP narrow band internet of things, NB-IoT standard. Particular examples of such machines or devices are sensors, metering devices such as power meters, industrial machinery, or home or personal appliances, e.g. refrigerators, televisions personal wearables, e.g., watches, fitness trackers, etc. In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116.

Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory e.g., Random Access Memory, RAM, or Read Only Memory ROM, mass storage media e.g., a hard disk, removable storage media, and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source e.g., an electricity outlet, photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 10:
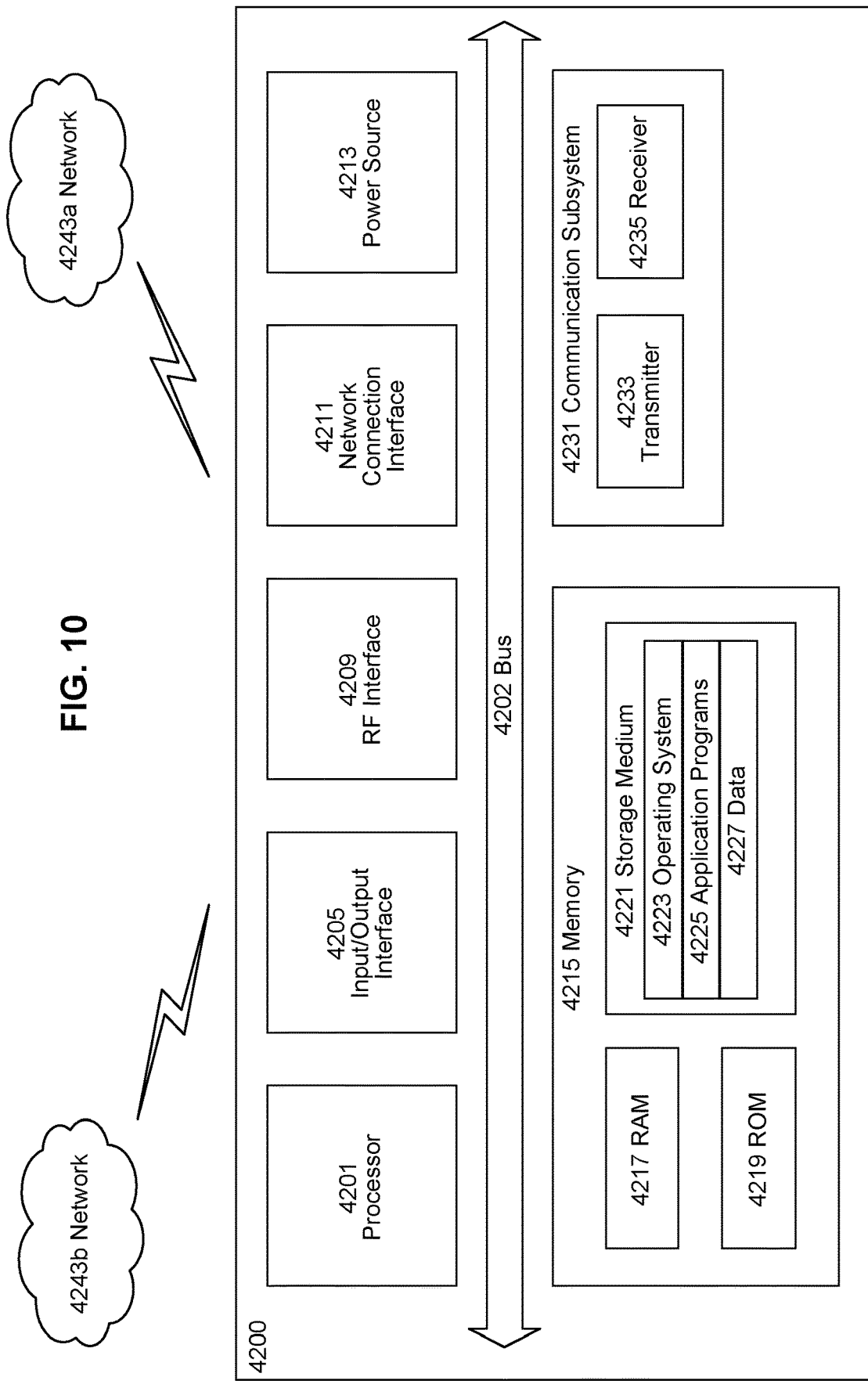
FIG. 10 is a block diagram of a UE.

FIG. 10 is another block diagram of a user equipment according to some embodiments. As used herein, the UE may not necessarily have a user in the sense of a human user who owns and/or operates the relevant device. Instead, a UE may represent a device that is intended for sale to, or operation by, a human user but which may not, or which may not initially, be associated with a specific human user, e.g., a smart sprinkler controller. Alternatively, a UE may represent a device that is not intended for sale to, or operation by, an end user but which may be associated with or operated for the benefit of a user e.g., a smart power meter. A UE 4200 may be any UE identified by the 3GPP, including a NB-IoT UE, a machine type communication, MTC, UE, and/or an enhanced MTC, eMTC, UE. The UE 4200, as illustrated in FIG. 10, is one example of a WD configured for communication in accordance with one or more communication standards promulgated by the 3GPP, such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, the UE 4200 includes processing circuitry 4201 that is operatively coupled to input/output interface 4205, a radio frequency, RF, interface 4209, network connection interface 4211, a memory 4215 including random access memory, RAM 4217, read-only memory, ROM 4219, and a storage medium 4221 or the like, communication subsystem 4231, power source 4213, and/or any other component, or any combination thereof. A storage medium 4221 includes operating system 4223, application program 4225, and data 4227. In other embodiments, storage medium 4221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines, e.g., in discrete logic, FPGA, ASIC, etc.; programmable logic together with appropriate firmware; one or more stored program, general-purpose processors, such as a microprocessor or Digital Signal Processor, DSP, together with appropriate software; or any combination of the above. For example, the processing circuitry 4201 may include two central processing units, CPUs. Data may be information in a form suitable for use by a computer.

In the depicted embodiment, input/output interface 4205 may be configured to provide a communication interface to an input device, output device, or input and output device. The UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network, LAN, a wide-area network, WAN, a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory, PROM, erasable programmable read-only memory EPROM, electrically erasable programmable read-only memory EEPROM, magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks, RAID, floppy disk drive, flash memory, USB flash drive, external hard disk drive, thumb drive, pen drive, key drive, high-density digital versatile disc, HD-DVD optical disc drive, internal hard disk drive, Blu-Ray optical disc drive, holographic digital data storage, HDDS optical disc drive, external mini-dual in-line memory module, DIMM, synchronous dynamic random access memory, SDRAM, external micro-DIMM SDRAM, smartcard memory such as a subscriber identity module or a removable user identity, SIM/RUIM module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 10, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links. Further, transmitter 4233 and receiver 4235 of each transceiver may share circuit components, software or firmware, or alternatively may be implemented separately.

The communication functions of communication subsystem 4231 may include data communication, voice communication, multimedia), short-range communications such as Bluetooth, near-field communication, location-based communication such as the use of the global positioning system, GPS to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network LAN, a wide-area network, WAN, a computer network, a wireless network, a telecommunications network, another like network or any combination thereof. For example, network 4243b may be a cellular network, a Wi-Fi network, and/or a near-field network. Power source 4213 may be configured to provide alternating current, AC, or direct current, DC power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 11:
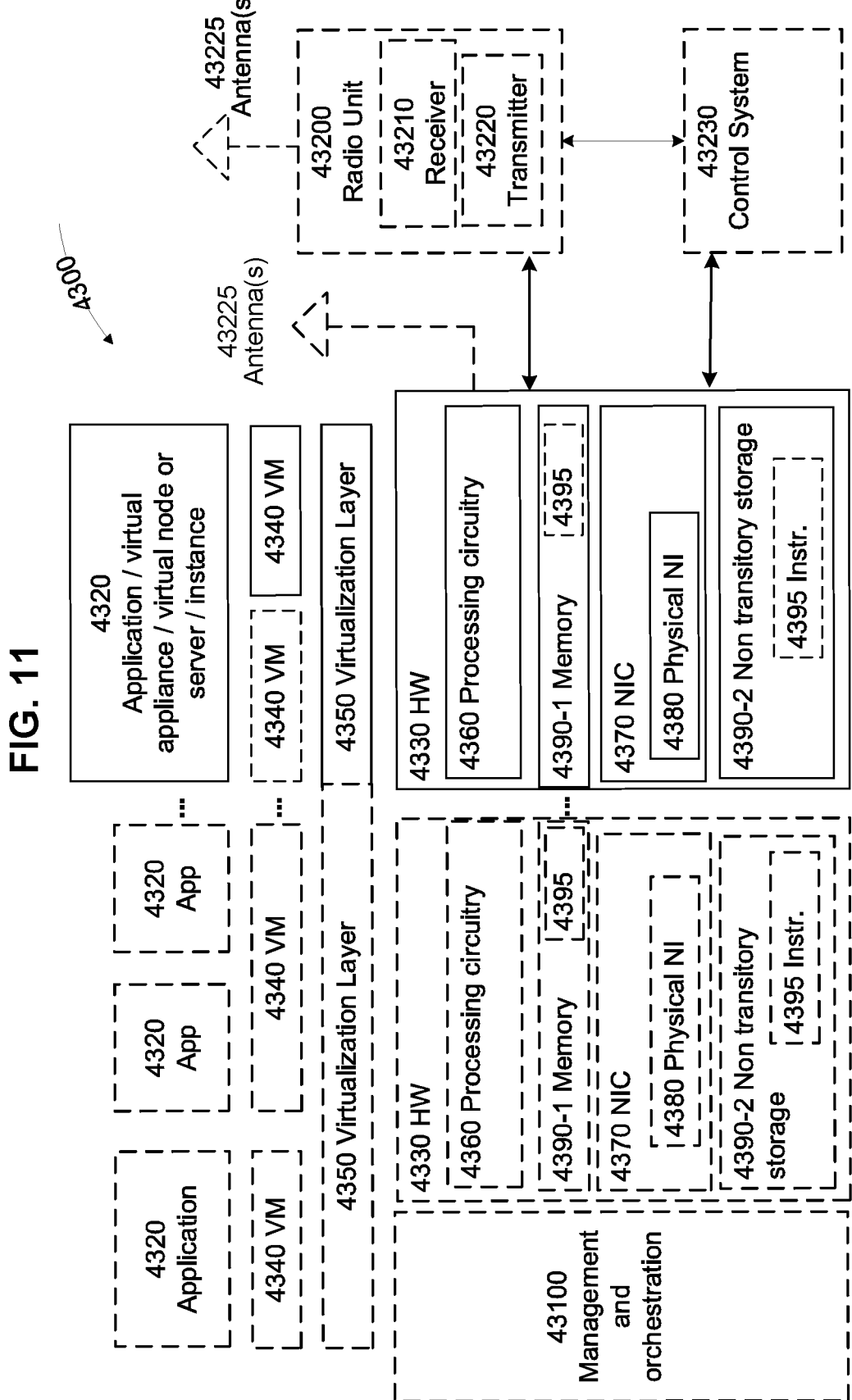
FIG. 11 is a block diagram of a virtualization environment.

FIG. 11 is a block diagram of a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node, e.g., a virtualized base station or a virtualized radio access node, or to a device, e.g., a UE, a wireless device or any other type of communication device or components thereof and relates to an implementation in which at least a portion of the functionality is implemented as one or more virtual components, e.g., via one or more applications, components, functions, virtual machines or containers executing on one or more physical processing nodes in one or more networks.

Some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity, then the network node may be entirely virtualized.

The functions may be implemented by one or more applications 4320 which may alternatively be called software instances, virtual appliances, network functions, virtual nodes, virtual network functions, etc., operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf, COTS, processors, dedicated Application Specific Integrated Circuits, ASICs, or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers, NICs 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350, software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor, VMM. Virtualization layer 4350 may present a virtual operating platform that appears like networking hardware to virtual machine 4340.

As shown in FIG. 11, hardware 4330 may be a standalone network node with generic or specific components. Hardware 4330 may comprise antenna 43225 and may implement some functions via virtualization. Alternatively, hardware 4330 may be part of a larger cluster of hardware, e.g., such as in a data center or customer premise equipment where many hardware nodes work together and are managed via management and orchestration, MANO 43100, which, among others, oversees lifecycle management of applications 4320.

Virtualization of the hardware is in some contexts referred to as network function virtualization, NFV. The NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements, VNE.

Still in the context of NFV, virtual network function, VNF is responsible for handling specific network functions that run in one or more virtual machines 4340 on top of hardware networking infrastructure 4330 and corresponds to application 4320 in FIG. 11.

One or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

Some signalling can be effected with the use of control system 43230 which may alternatively be used for communication between the hardware nodes 4330 and radio units 43200.

Figure 12:
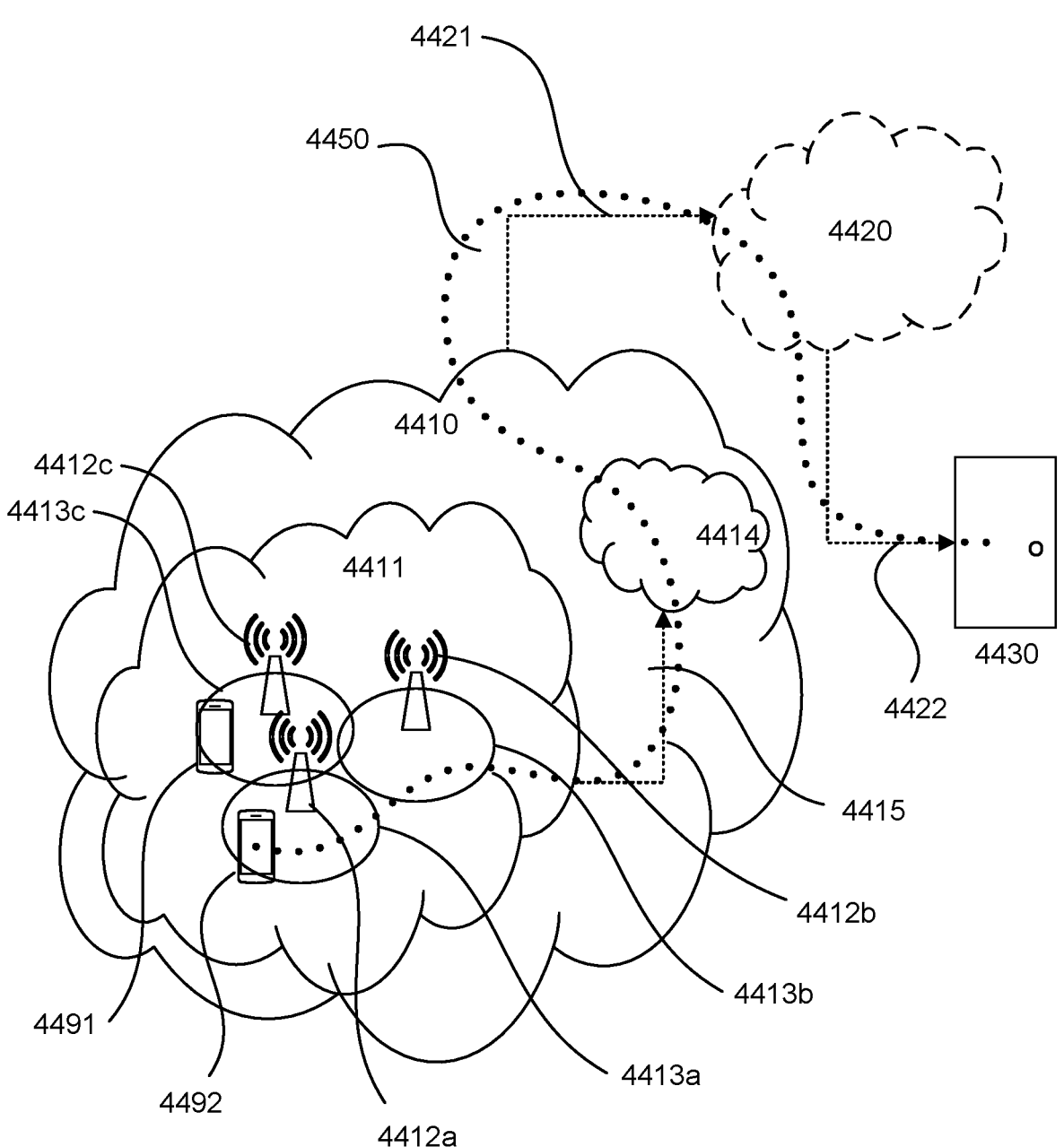
FIG. 12 is a block diagram of a telecommunication network connected via an intermediate network to a host computer.

FIG. 12 is a block diagram of a telecommunication network connected via an intermediate network to a host computer according to some embodiments. With reference to FIG. 12, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 12 as a whole enables connectivity between the connected UEs 4491, 4492 and host computer 4430. The connectivity may be described as an over-the-top, OTT connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 13:
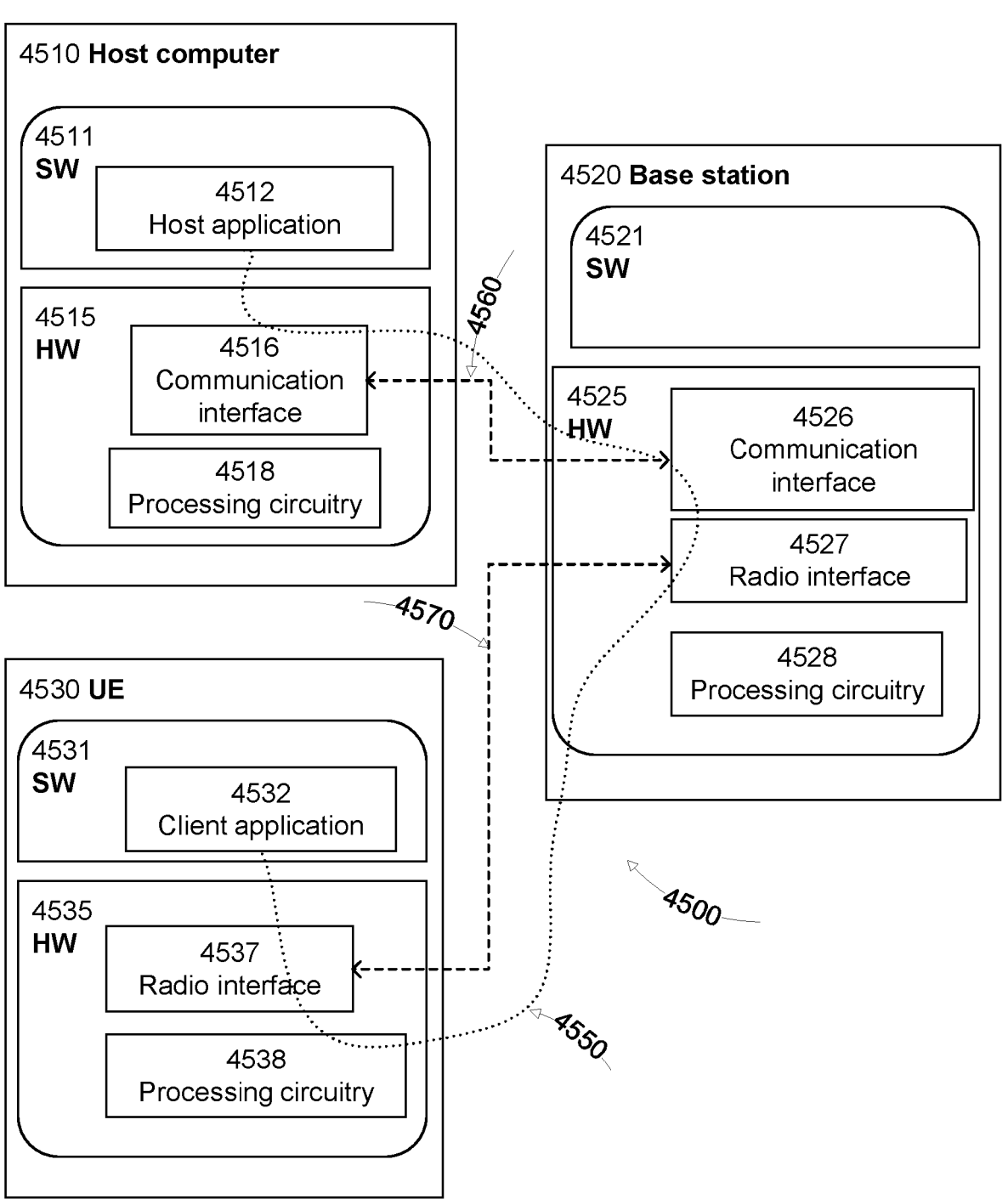
FIG. 13 is a block diagram of a host computer communicating via a base station with a UE over a partially wireless connection.

FIG. 13 is a block diagram of a host computer communicating via a base station with a user equipment over a partially wireless connection. Example implementations, in accordance with an embodiment, of the UE, base station and host computer discussed in the preceding paragraphs will now be described with reference to FIG. 13. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities.

In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 13) served by base station 4520. Communication interface 4526 may be configured to facilitate connection 4560 to host computer 4510. Connection 4560 may be direct or it may pass through a core network (not shown in FIG. 13) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

Figures 14, 15:
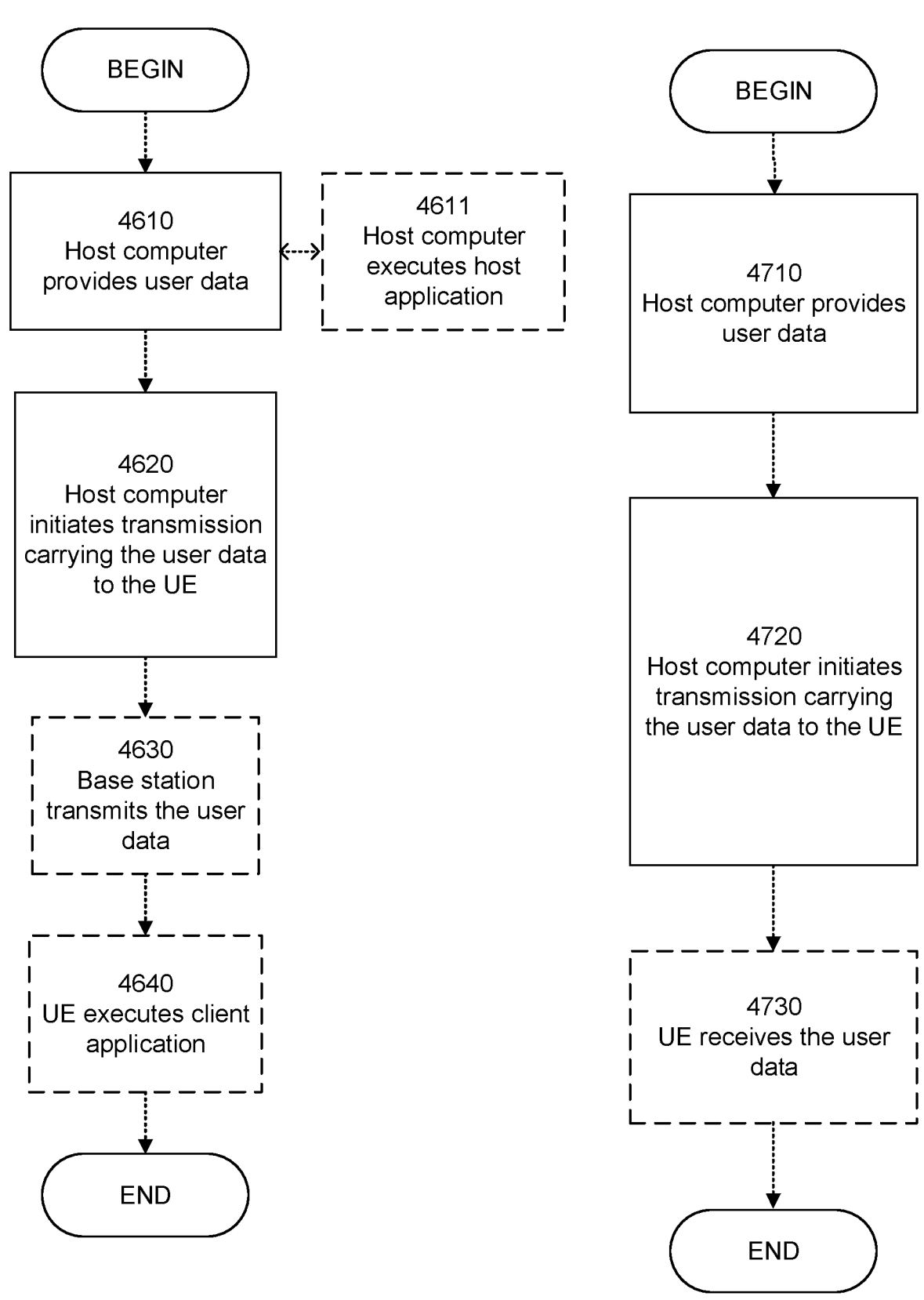
FIG. 14 is a block diagram of methods implemented in a communication system including a host computer, a base station, and a UE.
FIG. 15 is a block diagram of methods implemented in a communication system including a host computer, a base station, and a UE.

It is noted that host computer 4510, base station 4520 and UE 4530 illustrated in FIG. 16 may be similar or identical to host computer 4430, one of base stations 4412*a*, 4412*b*, 4412c and one of UEs 4491, 4492 of FIG. 15, respectively. This is to say, the inner workings of these entities may be as shown in FIG. 13 and independently, the surrounding network topology may be that of FIG. 12.

In FIG. 13, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors or the like.

FIG. 14 is a block diagram of methods implemented in a communication system including a host computer, a base station, and a user equipment according to some embodiments. The communication system includes a host computer, a base station and a UE which may be those described with reference to FIGS. 9-10. For simplicity of the present disclosure, only drawing references to FIG. 14 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 15 is a block diagram of methods implemented in a communication system including a host computer, a base station, and a user equipment according to some embodiments. The communication system includes a host computer, a base station and a UE which may be those described with reference to FIGS. 9-10. For simplicity of the present disclosure, only drawing references to FIG. 15 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission FIG. 16 is a block diagram of methods implemented in a communication system including a host computer, a base station, and a user equipment according to some embodiments. The communication system includes a host computer, a base station and a UE which may be those described with reference to FIGS. 9-10. For simplicity of the present disclosure, only drawing references to FIG. 16 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 17 is a block diagram of methods implemented in a communication system including a host computer, a base station, and a user equipment according to some embodiments. FIG. 17 is a flowchart illustrating a method implemented in a communication system, in accordance with one embodiment. The communication system includes a host computer, a base station and a UE which may be those described with reference to FIGS. 9-10. For simplicity of the present disclosure, only drawing references to FIG. 17 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
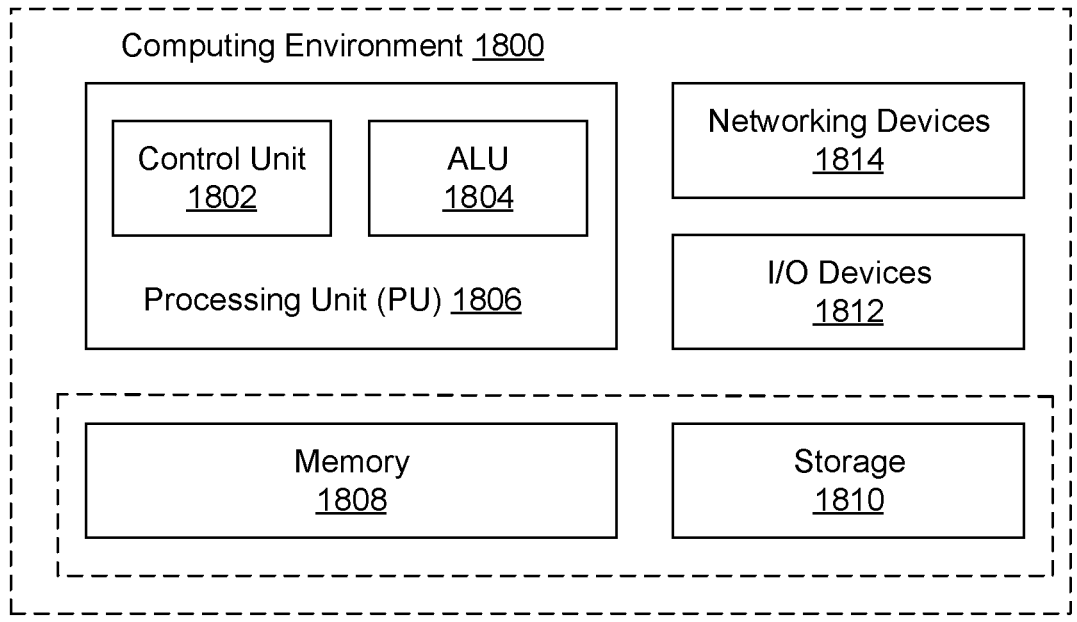
FIG. 18 discloses an example computing environment.

FIG. 18 discloses an example computing environment 1800 implementing a method and the network node and the UE for MBS services to UEs in IDLE and INACTIVE states as described in FIG. 2 and FIGS. 3-5. As depicted in FIG. 18, the computing environment 1800 comprises at least one data processing unit 1806 that is equipped with a control unit 1802 and an Arithmetic Logic Unit, ALU 1804, a memory 1808, a storage 1810, plurality of networking devices 1814 and a plurality Input output, I/O devices 1812. The data processing unit 1806 is responsible for processing the instructions of the algorithm. For example, the data processing unit 1806 is equivalent to the processor of the network node. The data processing unit 1806 is capable of executing software instructions stored in memory 1808. The data processing unit 1806 receives commands from the control unit 1802 in order to perform its processing. Further, any logical and arithmetic operations involved in the execution of the instructions are computed with the help of the ALU 1804. The computer program is loadable into the data processing unit 1806, which may, for example, be comprised in an electronic apparatus (such as a UE or a network node). When loaded into the data processing unit 1806, the computer program may be stored in the memory 1808 associated with or comprised in the data processor. According to some embodiments, the computer program may, when loaded into and run by the data processing unit 1806, cause execution of method steps according to, for example, any of the methods illustrated in FIGS. 2 and FIGS. 3-5 or otherwise described herein The overall computing environment 1800 may be composed of multiple homogeneous and/or heterogeneous cores, multiple CPUs of different kinds, special media and other accelerators. The data processing unit 1806 is responsible for processing the instructions of the algorithm. Further, the plurality of data processing units 1806 may be located on a single chip or over multiple chips.

The algorithm comprising of instructions and codes required for the implementation are stored in either the memory 1808 or the storage 1810 or both. At the time of execution, the instructions may be fetched from the corresponding memory 1808 and/or storage 1810, and executed by the data processing unit 1806.

In case of any hardware implementations various networking devices 1814 or external I/O devices 1812 may be connected to the computing environment to support the implementation through the networking devices 1814 and the I/O devices 1812.

The embodiments disclosed herein can be implemented through at least one software program running on at least one hardware device and performing network management functions to control the elements. The elements shown in FIG. 18 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method performed by a network node for providing Multicast and Broadcast services (MBS) to one or more User Equipments (UEs) in a wireless communication network, wherein the method comprises:

determining the one or more UEs in one of: a Radio Resource Control (RRC) IDLE state and an RRC INACTIVE state;

transmitting a paging message comprising an indication to acquire Point-To-Multipoint (PTM) configuration information by the determined one or more UEs for enabling reception of MBS data in one of the RRC IDLE state and the RRC INACTIVE state; and transmitting the MBS data to the determined one or more UEs using a PTM configuration indicated by the PTM configuration information.

2. The method according to claim 1, further comprising:

deciding an RRC state of the one or more UEs for reception of MBS data based on one or more of: one or more network parameters for the MBS, capability information of the one or more UEs and one or more MBS parameters.

3. The method according to claim 1, further comprising:

determining whether to transmit the PTM configuration information to the one or more UEs in one of the RRC IDLE state and the RRC INACTIVE state through a common control channel; and transmitting the PTM configuration information to the one or more UEs through the common control channel when it is determined that the PTM configuration information is to be transmitted through the common control channel.

4. The method according to claim 1, wherein the paging message comprises one or more of:

a session identifier (ID) for the MBS;

an indication to at least one of the determined one or more UEs for reception of the MBS data in the RRC IDLE state and the RRC INACTIVE state or an RRC CONNECTED state;

an indication to at least one of the determined one or more UEs to enter the RRC CONNECTED state for acquiring the PTM configuration information;

a preamble indicating that the PTM configuration information for reception of the MBS data is to be acquired in the RRC CONNECTED state;

an indicator to be monitored by each of the UEs for obtaining the preamble;

an indication for the determined one or more UEs on whether to use pre-stored PTM configuration information or to enter an RRC CONNECTED state through a random access procedure for acquiring the PTM configuration information;

an indication for at least one of the determined one or more UEs on whether to reuse a recent PTM configuration or to acquire the PTM configuration;

an indication of whether at least one of the determined one or more UEs is to enter the RRC CONNECTED state from one of the RRC IDLE state and the RRC INACTIVE state;

an indication of whether a PTM transmission is a last PTM transmission in a session associated with the PTM configuration information;

an indication about a start time interval and an end time interval of an MBS session; and an indication of whether the one or more UEs need to respond to the paging message.

5. The method according to claim 1, wherein the PTM configuration information is transmitted to the one or more UEs in the RRC CONNECTED state when the paging message comprising the indication to enter the RRC CONNECTED state is transmitted.

6. The method according to claim 1, wherein the PTM configuration information comprises one or more of: a service identifier (ID), a session ID, information related to scheduling of PTM data, information about neighboring cells transmitting the MBS data, information of ongoing MBS sessions, and information of all MBS sessions.

7. The method according to claim 1, wherein the PTM configuration information is transmitted through a common control channel in a system information block (SIB) which is transmitted periodically by the network node.

8. The method according to claim 7, wherein the common control channel is a PTM downlink control channel.

9. The method according to claim 7, wherein the PTM configuration information is transmitted to the one or more UEs through the common control channel, based on reception of a request for the PTM configuration information from the one or more UEs in one of the RRC IDLE state and the RRC INACTIVE state.

10. The method according to claim 1, wherein transmitting the paging message indicating the PTM configuration information to be acquired by the one or more UEs comprises:

indicating the PTM configuration information through one or more SIBs, which is broadcast periodically by the network node.

11. The method according to claim 1, wherein transmitting the paging message indicating the PTM configuration information to be acquired by the one or more UEs comprises:

receiving a request for the PTM configuration information from the one or more UEs in one of the RRC IDLE state and the RRC INACTIVE state; and indicating the PTM configuration information to the one or more UEs in a SIB.

12. The method according to claim 1, wherein transmitting the paging message indicating the PTM configuration information to be acquired by the one or more UEs comprises:

indicating the PTM configuration information through a PTM downlink control channel.

13. The method according to claim 1, wherein transmitting the paging message indicating the PTM configuration information to be acquired by the one or more UEs comprises:

receiving information of sessions related to MBS data from the one or more UEs in a message 3 (MSG3) of the random access procedure; and indicating the PTM configuration information related to the MBS data to the one or more UEs in a message 4 (MSG4) of the random access procedure.

14. A method performed by a user equipment (UE) for reception of Multicast and Broadcast services (MBS) from a network node, in a wireless communication network, wherein the method comprises:

transitioning to one of: a Radio Resource Control (RRC) IDLE state and an RRC INACTIVE state;

receiving a paging message comprising Point-To-Multipoint (PTM) configuration information to be acquired for reception of MBS data in one of the RRC IDLE state and the RRC INACTIVE state; and receiving the MBS data from the network node using a PTM configuration indicated by the PTM configuration information.

15. The method according to claim 14, further comprising:

determining that the PTM configuration information is to be acquired on a common control channel; and receiving the PTM configuration information through the common control channel when the PTM configuration information is transmitted on the common control channel.

16. The method according to claim 14, wherein the PTM configuration information comprises one or more of:

a service identifier (ID);

a session ID;

an indication for reception of the MBS data in the RRC IDLE state and the RRC INACTIVE state or an RRC CONNECTED state;

an indication to enter the RRC CONNECTED state for acquiring the PTM configuration information;

a preamble to acquire the PTM configuration information for reception of the MBS data in the RRC CONNECTED state;

an indicator to be monitored for obtaining the preamble;

an indication of whether to use pre-stored PTM configuration information or to enter an RRC CONNECTED state through a random access procedure for acquiring the PTM configuration;

an indication of whether to reuse a recent PTM configuration or to acquire the PTM configuration;

an indication to enter the RRC CONNECTED state from one of the RRC IDLE state and the RRC INACTIVE state;

an indication of whether a PTM transmission is a last PTM transmission in a session associated with the PTM configuration information;

an indication about a start time interval and an end time interval of an MBS session; and an indication of whether to respond to the paging message.

17. The method according to claim 14, wherein the step of receiving the MBS data from the network node comprises:

configuring a PTM radio bearer based on the PTM configuration information; and receiving the MBS data using the PTM radio bearer.

18. The method according to claim 14, wherein the PTM configuration information is received in the RRC CONNECTED state when the paging message comprising the indication for the UE to enter the RRC CONNECTED state for acquiring the PTM configuration information is received.

19. The method according to claim 14, wherein the PTM configuration information comprises one or more of: a service identifier (ID), a session ID, information related to scheduling of PTM data, information about neighboring cells transmitting the MBS data, information of ongoing MBS sessions, and information of all MBS sessions.

20. The method according to claim 14, wherein the PTM configuration information is received through a common control channel in a system information block (SIB) which is transmitted periodically by the network node.

21. The method according to claim 20, wherein the common control channel is a PTM downlink control channel.

22. The method according to claim 20, wherein the PTM configuration information through the control channel is received in response to transmission of a request for the PTM configuration information in one of the RRC IDLE state and the RRC INACTIVE state.

23. The method according to claim 14, wherein receiving the paging message indicating the PTM configuration information to be acquired by the UE comprises:

receiving an indication of PTM configuration information through one or more SIBs, which is broadcast periodically by the network node.

24. The method according to claim 14, wherein receiving the paging message indicating the PTM configuration information to be acquired by the UE comprises:

transmitting a request for the PTM configuration information in one of the RRC IDLE state and the RRC INACTIVE state; and receiving an indication of the PTM configuration information in a SIB.

25. The method according to claim 14, wherein receiving the paging message indicating the PTM configuration information to be acquired by the UE comprises:

receiving an indication of the PTM configuration information through a PTM downlink control channel.

26. The method according to claim 14, wherein receiving the paging message indicating the PTM configuration information to be acquired by the UE comprises:

transmitting information of sessions related to MBS data in a message 3 (MSG3) of the random access procedure; and receiving the PTM configuration information related to the MBS data in a message 4 (MSG4) of the random access procedure.

* * * * *